United States Patent
Shimomura

(10) Patent No.: US 12,108,374 B2
(45) Date of Patent: Oct. 1, 2024

(54) TERMINAL DEVICE, BASE STATION DEVICE, AND WIRELESS COMMUNICATION SYSTEM

(71) Applicant: FUJITSU LIMITED, Kawasaki (JP)

(72) Inventor: Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 372 days.

(21) Appl. No.: 17/590,847

(22) Filed: Feb. 2, 2022

(65) Prior Publication Data
US 2022/0159657 A1   May 19, 2022

Related U.S. Application Data

(63) Continuation of application No. PCT/JP2019/031270, filed on Aug. 7, 2019.

(51) Int. Cl.
*H04W 72/0453*   (2023.01)

(52) U.S. Cl.
CPC ............................. *H04W 72/0453* (2013.01)

(58) Field of Classification Search
CPC . H04W 72/0453; H04W 16/14; H04W 72/02; H04W 72/56
See application file for complete search history.

(56) References Cited

U.S. PATENT DOCUMENTS

| | | | |
|---|---|---|---|
| 2013/0294356 A1* | 11/2013 | Bala | H04W 56/001 370/329 |
| 2016/0381674 A1 | 12/2016 | Kim et al. | |
| 2018/0324793 A1 | 11/2018 | Kim et al. | |
| 2020/0228995 A1* | 7/2020 | Yang | H04W 74/0808 |
| 2020/0236729 A1* | 7/2020 | Ahn | H04W 16/14 |
| 2021/0168796 A1* | 6/2021 | Tie | H04L 5/0094 |

(Continued)

FOREIGN PATENT DOCUMENTS

JP   2017-506440 A   3/2017

OTHER PUBLICATIONS

International Search Report and Written Opinion issued by the Japan Patent Office for corresponding International Patent Application No. PCT/JP2019/031270, dated Nov. 5, 2019, with an English translation.

(Continued)

*Primary Examiner* — Kashif Siddiqui
(74) *Attorney, Agent, or Firm* — Myers Wolin, LLC

(57) ABSTRACT

A terminal device includes: a determination unit that determines whether an unlicensed band is being used by another device; and a processor that generates a transmission signal. The processor executes a process including: generating first and second information to which a first and a second resources in the unlicensed band, respectively, are allocated; and in a case where the first resource temporally overlaps with the second resource, generating, when a first determination result related to one of the resources starting first indicates that the unlicensed band is not being used, the transmission signal by assigning the first information to the one resource, and generating, when the first determination result indicates that the unlicensed band is being used, the transmission signal by assigning the first information to the other of the resources subsequently starting, in accordance with a second determination result related to the other resource.

10 Claims, 10 Drawing Sheets

(56) References Cited

U.S. PATENT DOCUMENTS

2022/0095352 A1* 3/2022 Gao .................. H04L 5/0064
2022/0279559 A1* 9/2022 Wong ................ H04L 5/0053
2022/0385340 A1* 12/2022 Yang ................. H04W 72/23

OTHER PUBLICATIONS

3GPP TS 36.133 V16.0.0, 3rd Generation Partnership Project; Technical Specification Group Radio Access Network; Evolved Universal Terrestrial Radio Access (E-UTRA); Requirements for support of radio resource management (Release 16), Dec. 2018.
3GPP TS 36.211 V15.5.0, 3rd Generation Partnership Project; Technical Specification Group Radio Access Network; Evolved Universal Terrestrial Radio Access (E-UTRA); Physical channels and modulation (Release 15), Mar. 2019.
3GPP TS 36.212 V15.5.0, 3rd Generation Partnership Project; Technical Specification Group Radio Access Network; Evolved Universal Terrestrial Radio Access (E-UTRA); Multiplexing and channel coding (Release 15), Mar. 2019.
3GPP TS 36.213 V15.5.0, 3rd Generation Partnership Project; Technical Specification Group Radio Access Network; Evolved Universal Terrestrial Radio Access (E-UTRA); Physical layer procedures (Release 15), Mar. 2019.
3GPP TS 36.214 V15.3.0, 3rd Generation Partnership Project; Technical Specification Group Radio Access Network; Evolved Universal Terrestrial Radio Access (E-UTRA); Physical layer; Measurements (Release 15), Sep. 2018.
3GPP TS 36.300 V15.5.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Mar. 2019.
3GPP TS 36.321 V15.5.0, 3rd Generation Partnership Project; Technical Specification Group Radio Access Network; Evolved Universal Terrestrial Radio Access (E-UTRA); Medium Access Control (MAC) protocol specification (Release 15), Mar. 2019.
3GPP TS 36.322 V15.1.0, 3rd Generation Partnership Project; Technical Specification Group Radio Access Network; Evolved Universal Terrestrial Radio Access (E-UTRA); Radio Link Control (RLC) protocol specification (Release 15), Jul. 2018.
3GPP TS 36.323 V15.3.0, 3rd Generation Partnership Project; Technical Specification Group Radio Access Network; Evolved Universal Terrestrial Radio Access (E-UTRA); Packet Data Convergence Protocol (PDCP) specification (Release 15), Mar. 2019.
3GPP TS 36.331 V15.5.1, 3rd Generation Partnership Project; Technical Specification Group Radio Access Network; Evolved Universal Terrestrial Radio Access (E-UTRA); Radio Resource Control (RRC); Protocol specification (Release 15), Apr. 2019.
3GPP TS 36.413 V15.5.0, 3rd Generation Partnership Project; Technical Specification Group Radio Access Network; Evolved Universal Terrestrial Radio Access Network (E-UTRAN); S1 Application Protocol (S1AP) (Release 15), Mar. 2019.
3GPP TS 36.423 V15.5.0, 3rd Generation Partnership Project; Technical Specification Group Radio Access Network; Evolved Universal Terrestrial Radio Access Network (E-UTRAN); X2 application protocol (X2AP) (Release 15), Mar. 2019.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.324 V15.1.0, 3rd Generation Partnership Project; Technical Specification Group Radio Access Network; E-UTRA and NR; Service Data Adaptation Protocol (SDAP) specification (Release 15), Sep. 2018.
3GPP TS 37.340 V15.5.0, 3rd Generation Partnership Project; Technical Specification Group Radio Access Network; Evolved Universal Terrestrial Radio Access (E-UTRA) and NR; Multi-connectivity; Stage 2 (Release 15), Mar. 2019.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.4.0, 3rd Generation Partnership Project; Technical Specification Group Radio Access Network; NR; Services provided by the physical layer (Release 15), Dec. 2018.
3GPP TS 38.211 V15.5.0, 3rd Generation Partnership Project; Technical Specification Group Radio Access Network; NR; Physical channels and modulation (Release 15), Mar. 2019.
3GPP TS 38.212 V15.5.0, 3rd Generation Partnership Project; Technical Specification Group Radio Access Network; NR; Multiplexing and channel coding (Release 15), Mar. 2019.
3GPP TS 38.213 V15.5.0, 3rd Generation Partnership Project; Technical Specification Group Radio Access Network; NR; Physical layer procedures for control (Release 15), Mar. 2019.
3GPP TS 38.214 V15.5.0, 3rd Generation Partnership Project; Technical Specification Group Radio Access Network; NR; Physical layer procedures for data (Release 15), Mar. 2019.
3GPP TS 38.215 V15.5.0, 3rd Generation Partnership Project; Technical Specification Group Radio Access Network; NR; Physical layer measurements (Release 15), Jun. 2019.
3GPP TS 38.300 V15.5.0, 3rd Generation Partnership Project; Technical Specification Group Radio Access Network; NR; NR and NG-RAN Overall Description; Stage 2 (Release 15), Mar. 2019.
3GPP TS 38.321 V15.5.0, 3rd Generation Partnership Project; Technical Specification Group Radio Access Network; NR; Medium Access Control (MAC) protocol specification (Release 15), Mar. 2019.
3GPP TS 38.322 V15.5.0, 3rd Generation Partnership Project; Technical Specification Group Radio Access Network; NR; Radio Link Control (RLC) protocol specification (Release 15), Mar. 2019.
3GPP TS 38.323 V15.5.0, 3rd Generation Partnership Project; Technical Specification Group Radio Access Network; NR; Packet Data Convergence Protocol (PDCP) specification (Release 15), Mar. 2019.
3GPP TS 38.331 V15.5.1, 3rd Generation Partnership Project; Technical Specification Group Radio Access Network; NR; Radio Resource Control (RRC) protocol specification (Release 15), Apr. 2019.
3GPP TS 38.401 V15.5.0, 3rd Generation Partnership Project; Technical Specification Group Radio Access Network; NG-RAN; Architecture description (Release 15), Mar. 2019.
3GPP TS 38.410 V15.2.0, 3rd Generation Partnership Project; Technical Specification Group Radio Access Network; NG-RAN; NG general aspects and principles (Release 15), Dec. 2018.
3GPP TS 38.413 V15.3.0, 3rd Generation Partnership Project; Technical Specification Group Radio Access Network; NG-RAN; NG Application Protocol (NGAP) (Release 15), Mar. 2019.
3GPP TS 38.420 V15.2.0, 3rd Generation Partnership Project; Technical Specification Group Radio Access Network; NG-RAN; Xn general aspects and principles (Release 15), Dec. 2018.
3GPP TS 38.423 V15.3.0, 3rd Generation Partnership Project; Technical Specification Group Radio Access Network; NG-RAN; Xn application protocol (XnAP) (Release 15), Mar. 2019.
3GPP TS 38.470 V15.5.0, 3rd Generation Partnership Project; Technical Specification Group Radio Access Network; NG-RAN; F1 general aspects and principles (Release 15), Mar. 2019.
3GPP TS 38.473 V15.5.0, 3rd Generation Partnership Project; Technical Specification Group Radio Access Network; NG-RAN; F1 application protocol (F1AP) (Release 15), Mar. 2019.
3GPP TS 23.501 V16.1.0, 3rd Generation Partnership Project; Technical Specification Group Services and System Aspects; System Architecture for the 5G System; Stage 2 (Release 16), Jun. 2019.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.

(56) References Cited

OTHER PUBLICATIONS

3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V15.0.0, "3rd Generation Partnership Project; Technical Specification Group Radio Access Network; Study on channel model for frequency spectrum above 6 GHz (Release 15)", Jun. 2018.
3GPP TR 38.912 V15.0.0, "3rd Generation Partnership Project; Technical Specification Group Radio Access Network; Study on New Radio (NR) access technology (Release 15)", Jun. 2018.
3GPP TR 38.913 V15.0.0, "3rd Generation Partnership Project; Technical Specification Group Radio Access Network; Study on Scenarios and Requirements for Next Generation Access Technologies; (Release 15)", Jun. 2018.
3GPP TR 38.889 V16.0.0, 3rd Generation Partnership Project; Technical Specification Group Radio Access Network; Study on NR-based access to unlicensed spectrum (Release 16), Dec. 2018.
3GPP TS 37.213 V15.2.0, 3rd Generation Partnership Project; Technical Specification Group Radio Access Network; Physical layer procedures for shared spectrum channel access (Release 15), Mar. 2019.
Qualcomm Incorporated, "Enhancements to Scheduling and HARQ operation for NR-U", Agenda Item: 7.2.2.2.3, 3GPP TSG-RAN WG1 Meeting #96b, R1-1905001, Xi'an, China, Apr. 8-12, 2019.
Fujitsu, "Scheduling/HARQ enhancements for NR-U", Agenda Item: 7.2.2.2.3, 3GPP TSG-RAN WG1 Meeting #97, R1-1906434, Reno, USA, May 13-17, 2019.
Fujitsu, "HARQ enhancements for NR-U", Agenda Item: 7.2.2.2.3, 3GPP TSG-RAN WG1 Meeting #98, R1-1908216, Prague, CZ, Aug. 26-30, 2019.

\* cited by examiner

FIG.10

| CHANNEL ACCESS PRIORITY CLASS | QCI |
|---|---|
| 1 | 1, 3, 5, 65, 66, 69, 70 |
| 2 | 2, 7 |
| 3 | 4, 6, 8, 9 |
| 4 | - |

TERMINAL DEVICE, BASE STATION DEVICE, AND WIRELESS COMMUNICATION SYSTEM

CROSS-REFERENCE TO RELATED APPLICATION

This application is a continuation of International Application No. PCT/JP2019/031270, filed on Aug. 7, 2019, the entire contents of which are incorporated herein by reference.

FIELD

The embodiments discussed herein are related to a terminal device, a base station device, and a wireless communication system.

BACKGROUND

In the current networks, traffic of mobile terminals (smartphones and feature phones) occupies most of network resources. Furthermore, traffic used by mobile terminals tends to be continuously increased in the future.

In contrast, with the development of Internet of things (IoT) services (for example, transportation systems, smart meters, monitoring systems for devices, and the like), there is a demand for coping with services having various requirements. Thus, in the communication standards for the fifth generation mobile communication (5G or New Radio (NR)), in addition to the standard technologies (for example, Non Patent Literatures 1 to 13 and 44) of the fourth generation mobile communication (4G), there is a demand for a technology that implements high-data-rate, high-capacity, and low-latency communication. Furthermore, regarding the fifth generation communication standards, technical studies are being conducted in 3GPP working groups (for example, TSG-RAN WG1, TSG-RAN WG2, and the like), and the first edition of the standard specification was released at the end of 2017 (Non-Patent Documents 14 to 43).

As described above, in order to respond various kinds of services, in 5G, support of a lot of use cases classified into enhanced mobile broadband (eMBB), massive machine type communications (MTC), and ultra-reliable and low latency communication (URLLC) is conceived.

In a 4G wireless communication system, for example, uplink data (hereinafter, referred to as "UL data") is transmitted in a physical uplink shared channel (PUSCH), and uplink control information (UCI) is transmitted in a physical uplink control channel (PUCCH). If both UL data and UCI are simultaneously transmitted, the UL data and the UCI are sometimes transmitted in the same PUSCH.

Furthermore, examples of the UCI includes, for example, AcK/Nack that is feedback information on downlink data (hereinafter, referred to as "DL data"), a scheduling request (SR) that requests allocation of a transmission resource, and periodic or non-periodic channel state information (CSI).

In contrast, regarding a downlink, for example, DL data is transmitted in a physical downlink shared channel (PDSCH) and downlink control information (DCI) is transmitted in a physical downlink control channel (PDCCH). Examples of the DCI includes an UL grant that indicates a resource allocation of a PUSCH, a DL assignment that indicates a resource allocation of a PDSCH, and the like, which are specified in the technical standards as a DCI format (Non-Patent Documents 2 and 17).

When a terminal device transmits an uplink signal by using a PUSCH, for example, the terminal device transmits the signal in accordance with the UL grant included in the DCI described above. Furthermore, if a timing at which the UCI is transmitted by using a PUCCH overlaps with a timing at which the UL data is transmitted by using the PUSCH, the terminal device multiplexes the UCI and the UL data and transmits the UCI and the UL data by using the PUSCH. In this way, a method of transmitting the uplink control information together with the data by using the PUSCH is also referred to as a piggyback.

At this moment, a part of communication performed using an unlicensed band is prescribed in 3GPP. When communication using an unlicensed band is used, in a device on a transmission side, signal transmission based on Listen-Before-Talk (LBT) is performed for fair coexistence between wireless networks. The device on the transmission side transmits a signal if, for example, a measured band is idle as a result of LBT, and does not transmits the signal if the measured band is busy. Furthermore, LBT is described in, for example, TS 36.213 (Non-Patent Document 4) or TS37.213 (Non-Patent Document 44) as channel access procedures.

---

Non-Patent Document 1: 3GPP TS 36.133 V16.0.0 (2018 December)
Non-Patent Document 2: 3GPP TS 36.211 V15.5.0 (2019 March)
Non-Patent Document 3: 3GPP TS 36.212 V15.5.0 (2019 March)
Non-Patent Document 4: 3GPP TS 36.213 V15.5.0 (2019 March)
Non-Patent Document 5: 3GPP TS 36.214 V15.3.0 (2018 September)
Non-Patent Document 6: 3GPP TS 36.300 V15.5.0 (2019 March)
Non-Patent Document 7: 3GPP TS 36.321 V15.5.0 (2019 March)
Non-Patent Document 8: 3GPP TS 36.322 V15.1.0 (2018 July)
Non-Patent Document 9: 3GPP TS 36.323 V15.3.0 (2019 March)
Non-Patent Document 10: 3GPP TS 36.331 V15.5.1 (2019 April)
Non-Patent Document 11: 3GPP TS 36.413 V15.5.0 (2019 March)
Non-Patent Document 12: 3GPP TS 36.423 V15.5.0 (2019 March)
Non-Patent Document 13: 3GPP TS 36.425 V15.0.0 (2018 June)
Non-Patent Document 14: 3GPP TS 37.324 V15.1.0 (2018 September)
Non-Patent Document 15: 3GPP TS 37.340 V15.5.0 (2019 March)
Non-Patent Document 16: 3GPP TS 38.201 V15.0.0 (2017 December)
Non-Patent Document 17: 3GPP TS 38.202 V15.4.0 (2018 December)
Non-Patent Document 18: 3GPP TS 38.211 V15.5.0 (2019 March)
Non-Patent Document 19: 3GPP TS 38.212 V15.5.0 (2019 March)
Non-Patent Document 20: 3GPP TS 38.213 V15.5.0 (2019 March)
Non-Patent Document 21: 3GPP TS 38.214 V15.5.0 (2019 March)
Non-Patent Document 22: 3GPP TS 38.215 V15.5.0 (2019 June)
Non-Patent Document 23: 3GPP TS 38.300 V15.5.0 (2019 March)
Non-Patent Document 24: 3GPP TS 38.321 V15.5.0 (2019 March)
Non-Patent Document 25: 3GPP TS 38.322 V15.5.0 (2019 March)
Non-Patent Document 26: 3GPP TS 38.323 V15.5.0 (2019 March)
Non-Patent Document 27: 3GPP TS 38.331 V15.5.1 (2019 April)
Non-Patent Document 28: 3GPP TS 38.401 V15.5.0 (2019 March)
Non-Patent Document 29: 3GPP TS 38.410 V15.2.0 (2018 December)
Non-Patent Document 30: 3GPP TS 38.413 V15.3.0 (2019 March)
Non-Patent Document 31: 3GPP TS 38.420 V15.2.0 (2018 December)
Non-Patent Document 32: 3GPP TS 38.423 V15.3.0 (2019 March)
Non-Patent Document 33: 3GPP TS 38.470 V15.5.0 (2019 March)
Non-Patent Document 34: 3GPP TS 38.473 V15.5.0 (2019 March)
Non-Patent Document 35: 3GPP TS 23.501 V16.1.0 (2019 June)
Non-Patent Document 36: 3GPP TR 38.801 V14.0.0 (2017 March)
Non-Patent Document 37: 3GPP TR 38.802 V14.2.0 (2017 September)
Non-Patent Document 38: 3GPP TR 38.803 V14.2.0 (2017 September)
Non-Patent Document 39: 3GPP TR 38.804 V14.0.0 (2017 March)
Non-Patent Document 40: 3GPP TR 38.900 V15.0.0 (2018 June)
Non-Patent Document 41: 3GPP TR 38.912 V15.0.0 (2018 June)
Non-Patent Document 42: 3GPP TR 38.913 V15.0.0 (2018 June)
Non-Patent Document 43: 3GPP TR 38.889 V16.0.0 (2018 December)
Non-Patent Document 44: 3GPP TS 37.213 V15.2.0 (2019 March)

---

However, there is a problem in that, in an unlicensed band, if a signal (for example, UCI) to be transmitted by using a PUCCH and a signal (for example, UL data) to be transmitted by a PUSCH are collectively transmitted by using the same PUSCH (i.e., piggybacking the UCI into the PUSCH), the communication characteristics are sometimes degraded. Specifically, for example, if an unlicensed band is busy as a result of LBT performed in an unlicensed band at a transmission timing of the PUSCH in which the UCI is subjected to piggyback, both of the UCI and the UL data are not transmitted.

Then, in particular, if the UCI is not transmitted, a communication efficiency is decreased in both of the uplink and the downlink. In other words, for example, if non-transmitted UCI is a SR, a request of a resource allocation for transmitting the UL data is delayed, and thus, transmission of the UL data is delayed. Furthermore, for example, if non-transmitted UCI is Ack/Nack, whether or not retransmission of the DL data is needed is not correctly fed back, and thus, unneeded retransmission may sometimes occur.

SUMMARY

According to an aspect of an embodiment, a terminal device includes: a determination unit that determines whether or not an unlicensed band for which a license is not needed to use in wireless communication is being used by another device; a processor that generates a transmission signal; and a transmitter that transmits the transmission signal. The processor executes a process including: generating first information and second information to which a first resource and a second resource in the unlicensed band, respectively, are allocated; and in a case where at least a part of the first resource temporally overlaps with a part of the second resource, generating, when a first determination result that is obtained by the determination unit and that is related to one of the resources that is started first indicates that the unlicensed band is not being used, the transmission signal by assigning the first information to the one resource, and generating, when the first determination result indicates that the unlicensed band is being used, the transmission signal by assigning the first information to the other of the resources that is subsequently started, in accordance with a second determination result that is obtained by the determination unit and that is related to the other resource.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating a specific example of priority of UL data.

DESCRIPTION OF EMBODIMENTS

Preferred embodiments of the present invention will be explained with reference to accompanying drawings. Furthermore, the present invention is not limited to the embodiments.

[a] First Embodiment

Figure 1:
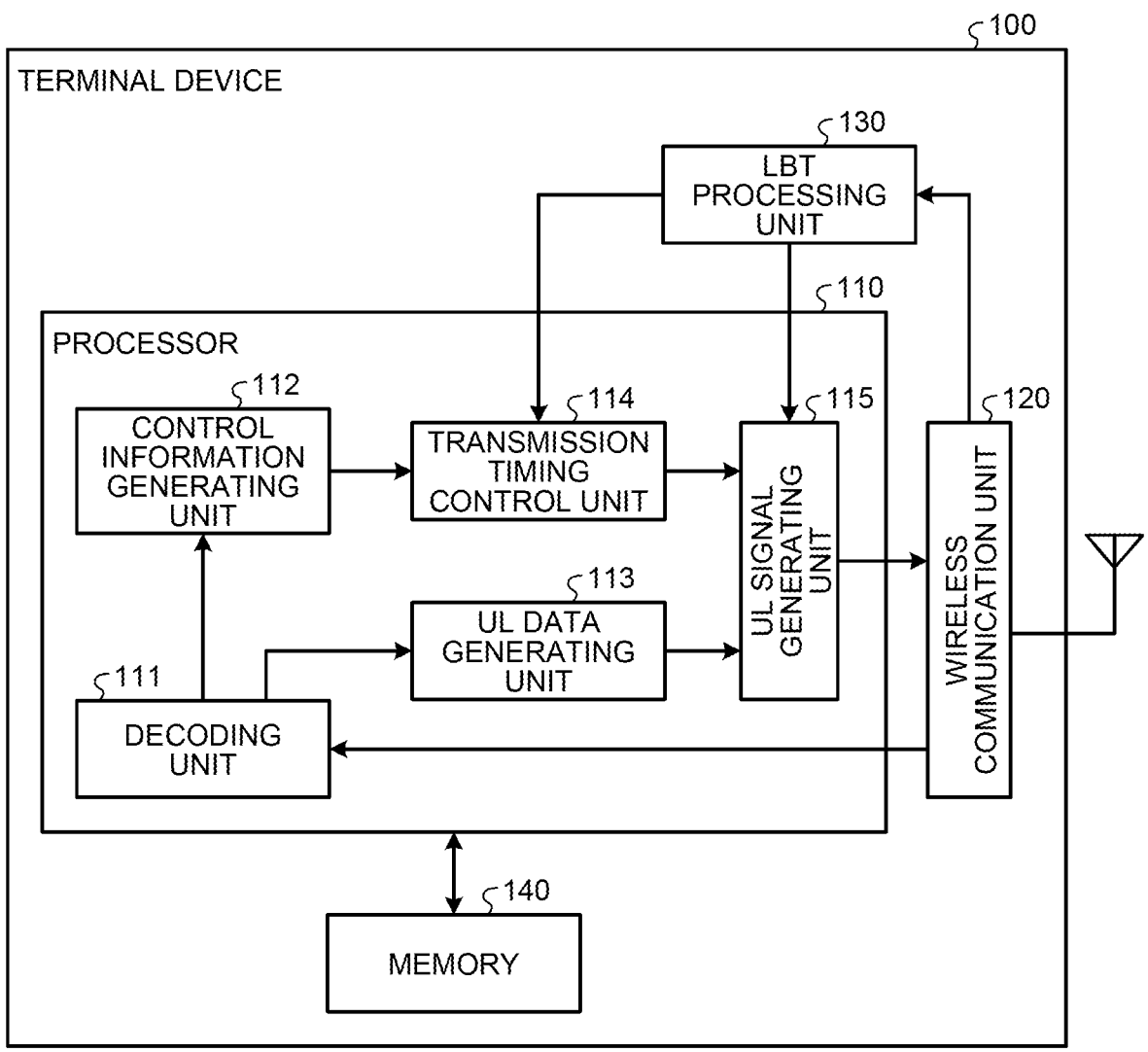
FIG. 1 is a block diagram illustrating a configuration of a terminal device according to a first embodiment.

FIG. 1 is a block diagram illustrating a configuration of a terminal device 100 according to a first embodiment. The terminal device 100 performs wireless communication by using an unlicensed band (hereinafter, referred to as a "U band"). The terminal device 100 illustrated in FIG. 1 includes a processor 110, a wireless communication unit 120, a LBT processing unit 130, and a memory 140. In FIG. 1, only the processing units related to communication performed by using the U band are illustrated; however, the terminal device 100 may also perform communication by using not only the U band but also a licensed band (hereinafter, referred to as an "L band").

The processor 110 includes, for example, a central processing unit (CPU), a field programmable gate array (FPGA), a digital signal processor (DSP), or the like, and performs overall control of the terminal device 100. Specifically, the processor 110 includes a decoding unit 111, a control information generating unit 112, an UL data generating unit 113, a transmission timing control unit 114, and an UL signal generating unit 115.

The decoding unit 111 demodulates and decodes a downlink signal (hereinafter, referred to as a "DL signal") received by the wireless communication unit 120, and acquires control information (DCI) and data (DL data) that are included in the DL signal. Examples of the DCI includes an UL grant that indicates a resource allocation of UL data and a DL assignment that indicates a resource allocation of DL data. The UL grant specifies the resource in a U band that is used to transmit the UL data and designates the frequency of the PUSCH and the time. The DL assignment specifies the resource in a U band that is used to transmit the DL data and notifies of the frequency and the time of the PDSCH. Furthermore, the DL assignment specifies the resource in a U band that is used to transmit feedback information (Ack/Nack) with respect to the DL data and designates the frequency and the time of the PUCCH.

The decoding unit 111 notifies the UL data generating unit 113 of the resource information that is used for the UL data and that is specified by the UL grant. Furthermore, the decoding unit 111 notifies the control information generating unit 112 of a decoding result that indicates whether or not the DL data has been correctly decoded and the resource information that is used for Ack/Nack specified by the DL assignment.

The control information generating unit 112 generates control information (UCI) that is transmitted through an uplink. Specifically, the control information generating unit 112 generates an Ack or a Nack in accordance with a decoding result of the DL data notified from the decoding unit 111. Namely, the control information generating unit 112 generates an Ack when the DL data is correctly decoded and generates a Nack when the DL data is not correctly decoded. Furthermore, if UL data to be transmitted is generated, the control information generating unit 112 generates a scheduling request (SR) that requests a resource allocation with respect to the UL data. Furthermore, the control information generating unit 112 generates channel state information (CSI) including measurement results of radio link quality in a predetermined period or at a timing at which a request is received from, for example, a base station device.

The UL data generating unit 113 generates data (UL data) including user information that is transmitted through an uplink. Specifically, if the UL data generating unit 113 receives a notification from the decoding unit 111 related to the resource information that is specified by the UL grant, the UL data generating unit 113 generates UL data including user information that is transmitted by using this resource. The UL data generating unit 113 outputs the generated UL data to the UL signal generating unit 115.

The transmission timing control unit 114 performs control of the transmission timing of the control information generated by the control information generating unit 112 in accordance with a result of a LBT process performed by the LBT processing unit 130. Specifically, if a result of the LBT process performed by the LBT processing unit 130 indicates that the resource for Ack/Nack specified by the DL assignment is idle, the transmission timing control unit 114 performs control such that the Ack/Nack is transmitted at a timing of this resource. Furthermore, if the resource for the SR is idle, the transmission timing control unit 114 performs control such that the SR is transmitted at a timing of this resource, whereas, if the resource for the CSI is idle, the transmission timing control unit 114 performs control such that the CSI is transmitted at a timing of this resource.

In this way, the transmission timing control unit 114 uses the resources for the respective pieces of control information as transmission opportunities and performs control such that, if a result of each of the LBT processes indicates that a U band is idle in each of the transmission opportunities, the control information is transmitted by using the associated resource. However, if the resource that is allocated to the control information temporally overlaps with the resource that is allocated to the UL data, the transmission timing control unit 114 determines that the both resources are the transmission opportunities of the control information. Namely, if, for example, a part of the resource allocated to an Ack/Nack temporally overlaps with a part of the resource allocated to the UL data, the transmission timing control unit 114 performs control, in accordance with the result of the LBT process in each of the resource that is started temporally first (hereinafter, referred to as a "first resource") and the resource that is subsequently started (hereinafter, referred to as a "subsequent resource"), such that the Ack/Nack is transmitted by using one of the resources.

Therefore, if the result of the LBT process in, for example, the first resource indicates that the U band is idle, the transmission timing control unit 114 performs control such that the Ack/Nack is transmitted by using the first resource. Then, even when the U band is busy in the first resource, if the result of the LBT process in the subsequent resource indicates that the U band is idle, the transmission timing control unit 114 performs control such that the Ack/Nack is transmitted by using the subsequent resource. Furthermore, not only in a case where a part of the resource allocated to the control information temporally overlaps with a part of the resource allocated to the UL data, but also in a case where the resources allocated to a plurality of pieces of different control information partially and temporally overlap with each other, the transmission timing control unit 114 may also use the plurality of resources as the transmission opportunities of the respective pieces of control information.

The UL signal generating unit 115 assigns the resource allocated to each of the pieces of control information and the pieces of UL data and generates an uplink signal (UL signal). Specifically, the UL signal generating unit 115 generates the UL signal by assigning the UL data to the resource that is specified by the UL grant and assigning the control information to the resource for transmission of the control information. At this time, the UL signal generating unit 115 assigns the control information to the resource that is at a transmission timing decided by the transmission timing control unit 114. Namely, if the control information is transmitted by using the resource that is allocated to the control information, the UL signal generating unit 115 assigns the control information to this resource. In contrast, if the control information is transmitted by using the resource that is allocated to the UL data, the UL signal generating unit 115 multiplexes the UL data with the control information, and then, assigns the multiplexed UL data and the control information to the resource that is allocated to the UL data.

Furthermore, if the UL signal generating unit 115 assigns the control information to the resource that is allocated to the control information, the UL signal generating unit 115 may perform assignment of the UL data such that the UL data is not assigned to the resource that temporally overlaps with the subject resource to which the control information is allocated. Namely, if the resource to which the control information is allocated temporally overlaps with the resource to which the UL data is allocated and if the control information is assigned to the resource that is allocated to the control information, the UL signal generating unit 115 may reduce an amount of data by a process of puncturing, for example, the UL data and assign the UL data to only the resource that does not temporally overlap with the resource for the control information. Furthermore, if the resource allocated to the UL data temporally overlaps with the resource for the control information, the UL signal generating unit 115 may stop assignment of the subject UL data to the resource.

If the result of the LBT process performed by the LBT processing unit 130 indicates that the U band is idle, the UL signal generating unit 115 outputs the generated UL signal to the wireless communication unit 120. Furthermore, if the result of the LBT process performed by the LBT processing unit 130 indicates that the U band is busy, the UL signal generating unit 115 suspends transmission of the UL signal without outputting the generated UL signal.

The wireless communication unit 120 performs a predetermined wireless transmission process, such as digital/analog (D/A) conversion and up-conversion, on the UL signal that is output from the UL signal generating unit 115, and then, transmits the processed UL signal via an antenna. Furthermore, the wireless communication unit 120 receives a DL signal associated with the U band and performs a predetermined wireless reception process, such as down-conversion and analog/digital (A/D) conversion, on the DL signal.

The LBT processing unit 130 performs the LBT process on the U band through the wireless communication unit 120. Namely, by measuring the reception power at the time of the reception process on the U band, the LBT processing unit 130 determines whether or not another device currently transmits a signal by using the U band. At this time, if the reception power is less than a predetermined threshold, the LBT processing unit 130 determines that the U band is idle and the UL signal is able to be transmitted. Furthermore, if the reception power is greater than or equal to the predetermined threshold, the LBT processing unit 130 determines that the U band is busy and the UL signal is not able to be transmitted.

Furthermore, if it is determined that the U band is idle by the number of times determined in accordance with a predetermined rule in compliance with the content of the control information and the UL data, the LBT processing unit 130 may also determine that UL signal is able to be transmitted. Specifically, the LBT processing unit 130 may also include a counter that counts the number of times the U band is determined to be idle. Then, if the number of times the U band is determined to be idle reaches a predetermined number of times and if the determination result obtained immediately before the transmission timing indicates an idle state, the LBT processing unit 130 may determine that the UL signal is able to be transmitted.

The LBT processing unit 130 grasps the resources allocated to the control information and the UL data and performs the LBT process at the timing of these resources. Namely, the LBT processing unit 130 determines whether or not the U band is idle before the transmission timing of the control information and the transmission timing of the UL data.

The memory 140 includes, for example, a random access memory (RAM), a read only memory (ROM), or the like, and stores information that is used by the processor 110 to perform processes.

Figure 2:
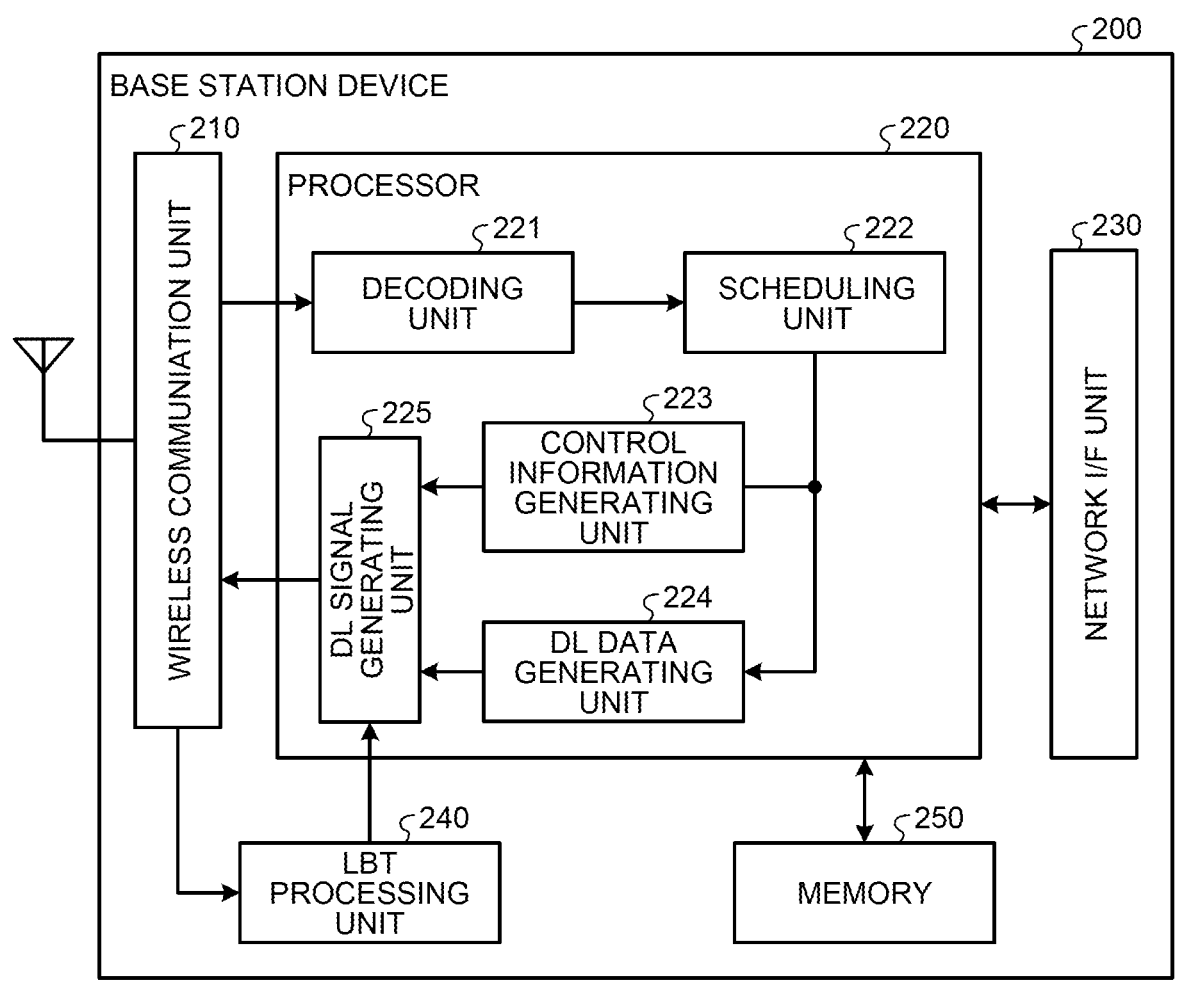
FIG. 2 is a block diagram illustrating a configuration of a base station device according to the first embodiment.

FIG. 2 is a block diagram illustrating a configuration of a base station device 200 according to the first embodiment. The base station device 200 performs wireless communication using a U band. The base station device 200 illustrated in FIG. 2 includes a wireless communication unit 210, a processor 220, a network interface unit (hereinafter, simply referred to as a "network I/F unit") 230, a LBT processing unit 240, and a memory 250. In FIG. 2, only the processing units related to communication performed using the U band are illustrated; however, the base station device 200 may also perform communication using not only the U band but also an L band.

The wireless communication unit 210 receives a UL signal transmitted from the terminal device 100 and performs a predetermined wireless reception process, such as down-conversion and A/D conversion, on the UL signal. Furthermore, the wireless communication unit 210 performs a predetermined wireless transmission process, such as D/A conversion and up-conversion, on the DL signal that is output from the processor 220.

The processor 220 includes, for example, a CPU, an FPGA, a DSP, or the like, and performs overall control of the base station device 200. Specifically, the processor 220 includes a decoding unit 221, a scheduling unit 222, a control information generating unit 223, a DL data generating unit 224, and a DL signal generating unit 225.

The decoding unit 221 demodulates and decodes the UL signal received by the wireless communication unit 210, and acquires control information (UCI) and data (UL data) that are included in the UL signal. Examples of the UCI includes a Ack/Nack that is feedback information with respect to the DL data, a SR that requests a resource allocation with respect to the UL data, and the CSI that includes measurement results of radio link quality.

The scheduling unit 222 performs scheduling of the uplink and the downlink. Specifically, the scheduling unit 222 performs scheduling of the uplink by allocating a resource to the UL data that is transmitted from each of the terminal devices on the basis of the SR acquired by the decoding unit 221. Furthermore, the scheduling unit 222 performs scheduling of the downlink by allocating a resource to the DL data that is transmitted to each of the terminal devices on the basis of the CSI that is acquired by the decoding unit 221.

The control information generating unit 223 generates control information (DCI) that is transmitted through the downlink. Specifically, the control information generating unit 223 generates a UL grant indicating the resource that is allocated to the UL data in accordance with the result of the scheduling of the uplink. Furthermore, the control information generating unit 223 generates a DL assignment indicating a resource that is allocated to the DL data in accordance with the result of the scheduling of the downlink.

The DL data generating unit 224 generates the DL data that is transmitted to each of the terminal devices in accordance with the result of the scheduling of the downlink. The DL data generating unit 224 outputs the generated DL data to the DL signal generating unit 225.

The DL signal generating unit 225 assigns the control information and the DL data to each of the allocated resources and generates a DL signal. Specifically, the DL signal generating unit 225 generates the DL signal by assigning the DL data to the resource in accordance with the result of the scheduling of the downlink and assigning the UL grant and the DL assignment to predetermined resources. Then, if the result of the LBT process performed by the LBT processing unit 240 indicates that the U band is idle, the DL signal generating unit 225 outputs the generated DL signal to the wireless communication unit 210. Furthermore, if the result of the LBT process performed by the LBT processing unit 240 indicates that the U band is busy, the DL signal generating unit 225 suspends the transmission of the DL signal without outputting the generated DL signal.

The network I/F unit 230 is an interface for connecting to a communication device or another base station device constituting, for example, a core network. The network I/F unit 230 receives information that is needed to generate the control information or information that is needed to generate the DL data from the communication device that constitutes the core network.

The LBT processing unit 240 performs the LBT process on the U band via the wireless communication unit 210. Namely, by measuring the reception power at the time of reception process on the U band, the LBT processing unit 240 determines whether or not another device currently transmits a signal by using the U band. At this time, if the reception power is less than a predetermined threshold, the LBT processing unit 240 determines that the U band is idle and the DL signal is able to be transmitted. Furthermore, if the reception power is greater than or equal to the predetermined threshold, the LBT processing unit 240 determines that the U band is busy and the DL signal is not able to be transmitted.

Furthermore, if it is determined that the U band is idle by the number of times determined in accordance with a predetermined rule in compliance with the content of the control information and the DL data, the LBT processing unit 240 may also determine that the DL signal is able to be transmitted. Specifically, the LBT processing unit 240 may also include a counter that counts the number of times the U band is determined to be idle. Then, if the number of times the U band is determined to be idle reaches a predetermined number of times and if the determination result obtained immediately before the transmission timing indicates an idle state, the LBT processing unit 240 may determine that the DL signal is able to be transmitted.

The memory 250 includes, for example, a RAM, a ROM, or the like, and stores the information that is used by the processor 220 to perform processes.

Figure 3:
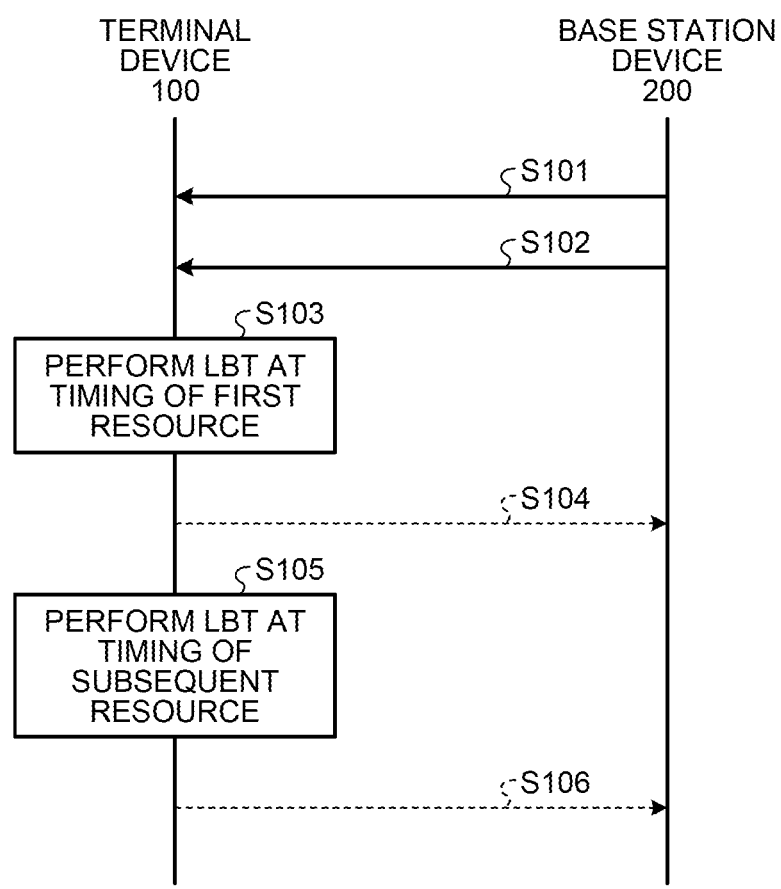
FIG. 3 is a sequence diagram illustrating an operation of a wireless communication system according to the first embodiment.

In the following, an operation of the wireless communication system that includes the terminal device 100 and the base station device 200 having configurations described above will be described with reference to the sequence diagram illustrated in FIG. 3. FIG. 3 illustrates an operation performed mainly when the UCI is transmitted from the terminal device 100. Here, a description will be made in a case in which, as an example, an Ack/Nack is transmitted as the UCI.

The base station device 200 allocates a resource to the DL data in accordance with the scheduling of the downlink, and then, transmits the DL data. Specifically, the DL assignment that indicates the allocation of the resource to the DL data is generated by the control information generating unit 223 and is transmitted through the wireless communication unit 210 (Step S101). In the DL assignment, the resource of the uplink through which the Ack/Nack with respect to the DL data is transmitted is designated. Then, the DL data associated with the result of the scheduling is generated by the DL data generating unit 224 and is transmitted through the wireless communication unit 210 (Step S102).

The DL assignment and the DL data that are transmitted from the base station device 200 are received by the wireless communication unit 120 included in the terminal device 100, and are demodulated and decoded by the decoding unit 111. Then, whether or not the DL data is correctly decoded by the decoding unit 111 is notified to the control information generating unit 112, and an Ack or a Nack is generated by the control information generating unit 112. The Ack/Nack is transmitted by using the resource that is designated by the DL assignment; however, here, it is assumed that this resource temporally overlaps with the resource that is allocated to the UL data. Namely, although the start time of the resource for the Ack/Nack is different from the start time of the resource for the UL data, in the following, a description will be made based on the assumption that the resources partially and temporally overlap with each other. Furthermore, the resource for the UL data is the resource that is allocated to the UL data indicated by a result obtained by the base station device 200 performing the scheduling of the uplink on the SR that is transmitted from the terminal device 100. This resource is notified to the terminal device 100 by the UL grant that is transmitted from the base station device 200.

If the resource for the Ack/Nack temporally overlaps with the resource for the UL data, both of the resources serve as a transmission opportunity of the Ack/Nack. Namely, the LBT process is performed by the LBT processing unit 130 at the timing of the first resource that is started first between the two resources (Step S103), and, if the first resource is idle, the Ack/Nack is transmitted to the base station device 200 by using this resource (Step S104). Furthermore, if the first resource is busy, the LBT process is performed at the timing of the subsequent resource that is subsequently started between the two resources (Step S105), and, if the subsequent resource is idle, the Ack/Nack is transmitted to the base station device 200 by using this resource (Step S106).

One of the first resource and the subsequent resource is the resource that is allocated to the Ack/Nack; therefore, when the Ack/Nack is transmitted by using this resource, the Ack/Nack is transmitted alone. At this time, although the resource for the Ack/Nack temporally overlaps with the resource allocated to the UL data, the UL data is not transmitted in a period of time for which the Ack/Nack is transmitted. Namely, an amount of data is reduced by a process of puncturing, for example, the UL data performed by the UL signal generating unit 115, and the UL data that has been subjected to puncturing is assigned to the portion of the resource for the UL data that does not temporally overlap with the resource for the Ack/Nack. Furthermore, the transmission of the UL data to be performed by using the resource that temporally overlaps with the resource for the Ack/Nack may be canceled by the UL signal generating unit 115.

The other of the first resource and the subsequent resource is the resource that is allocated to the UL data; however, if the Ack/Nack is transmitted by using this resource, the UL signal is generated by the UL signal generating unit 115 by multiplexing the UL data with the Ack/Nack and is then transmitted. In this case, an amount of data is also reduced by a process of puncturing, for example, the UL data performed by the UL signal generating unit 115, the UL data that has been subjected to puncturing is multiplexed with the Ack/Nack, and the obtained multiplexed data is assigned to the resource that is used for the UL data.

Furthermore, here, a case in which the resource for the Ack/Nack temporally overlaps with the resource for the UL data has been described; however, for example, similarly, in a case in which the resource for the Ack/Nack temporally overlaps with the resource for the CSI, a plurality of transmission opportunities of the control information may be provided. Namely, if the resources for different pieces of UCI temporally overlap with each other, the respective resources are determined to be the transmission opportunities of all of the pieces of control information, and all of the pieces of multiplexed control information may be transmitted by using the resources that are determined to be idle indicated by the results of the LBT processes.

Figure 4:
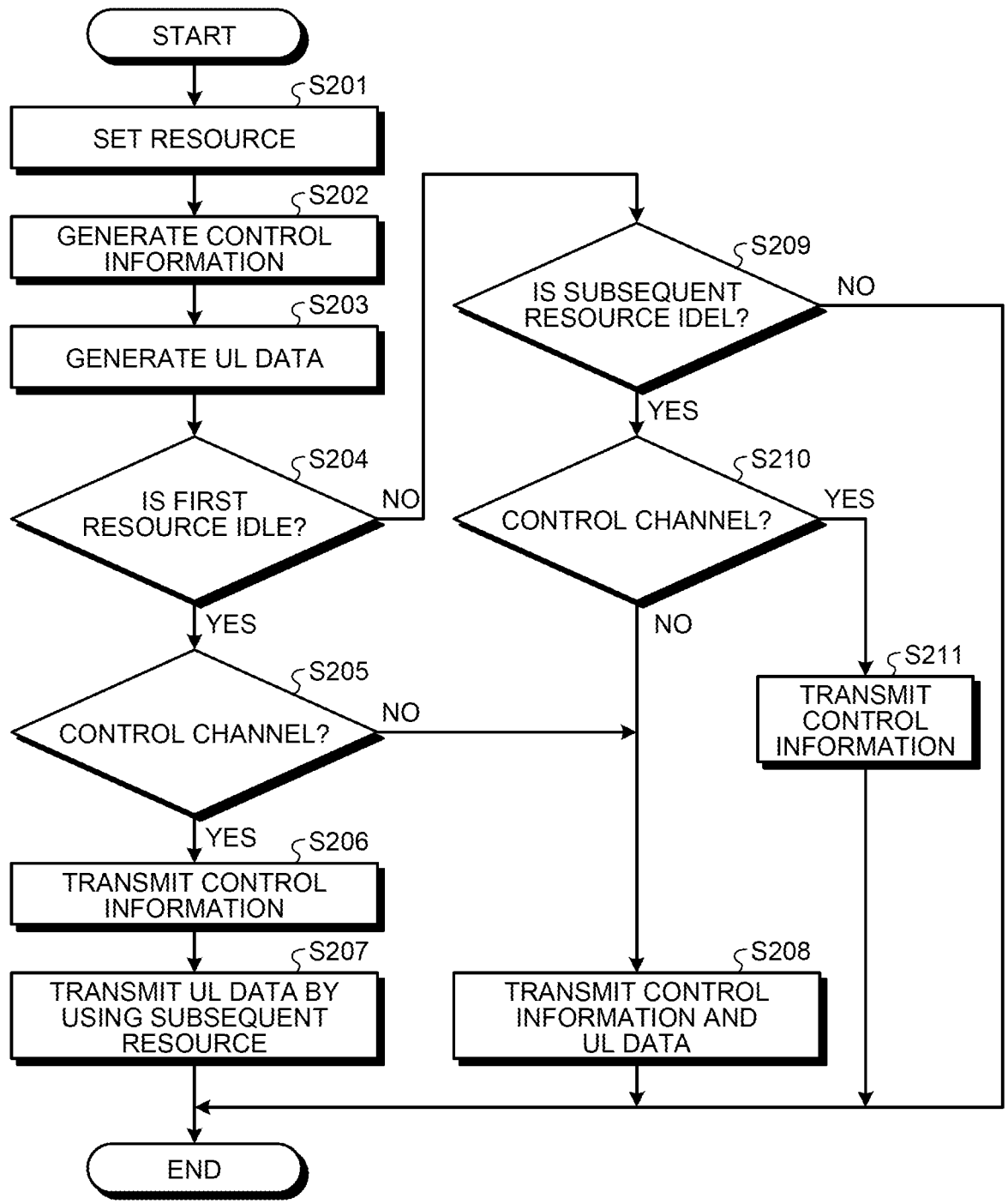
FIG. 4 is a flowchart illustrating a transmission method of control information according to the first embodiment.

In the following, a transmission method of the control information performed by the terminal device 100 according to the first embodiment will be described with reference to the flowchart illustrated in FIG. 4.

If the UCI or the UL data is transmitted from the terminal device 100 by using the U band, the resource that is used for the transmission is set (Step S201). Specifically, if the Ack/Nack is transmitted, the resource designated by the DL assignment that is received from the base station device 200 is set to the resource for the Ack/Nack. Furthermore, if the SR is transmitted, a desired resource after the UL data to be transmitted is generated is set to the resource for the SR. Furthermore, if the CSI is transmitted, a predetermined periodic resource or a non-periodic resource that is designated by the base station device 200 is set to the resource for the CSI. Then, if the UL data is transmitted, the resource designated by the UL grant that is received from the base station device 200 is set to the resource for the UL data.

In this way, before the transmission of the UCI or the UL data, the resources that are used for the transmission of the UCI and the UL data are set. If these resources do not temporally overlap with each other, the UCI and the UL data are transmitted by using the respective resources. Here, a description will be given of the transmission method of the control information in a case in which the resource for the UCI temporally overlaps with the resource for the UL data. However, it is assumed that the start time of the resource for the UCI is different from the start time of the resource for the UL data and at least a part of the two resources temporally overlap with each other.

If the resources for the UCI and the UL data are set, the UCI is generated by the control information generating unit 112 (Step S202). Namely, if the DL data is decoded by the decoding unit 111, the Ack/Nack are generated by the control information generating unit 112. Furthermore, if the UL data to be transmitted is generated, the SR is generated by the control information generating unit 112. Furthermore, if it is a predetermined period at which a wireless status is to be reported or if a request is received from the base station device 200, the CSI is generated by the control information generating unit 112. The generated UCI is output to the transmission timing control unit 114.

In contrast, if the UL grant is acquired by the decoding unit 111, the UL data is generated by the UL data generating unit 113 (Step S203). The generated UL data is output to the UL signal generating unit 115.

Then, if the timing of the first resource that is started first between the resources for the UCI and the UL data arrives, the LBT process is performed on the U band by the LBT processing unit 130 (Step S204). If the result of the LBT process indicates that the U band is idle (Yes at Step S204), the UCI is output from the transmission timing control unit 114 to the UL signal generating unit 115 in order to transmit the UCI by using the first resource.

Then, whether or not the first resource is the resource for the UCI is determined by the UL signal generating unit 115 (Step S205), and, if the first resource is the resource for the UCI (Yes at Step S205), the UCI is assigned to the first resource and the UL signal is generated. The UL signal that includes the UCI is transmitted to the base station device 200 through the wireless communication unit 120 (Step S206). In this case, the subsequent resource that temporally overlaps with the first resource is the resource for the UL data, so that the UL data is assigned to the subsequent resource by the UL signal generating unit 115 and the UL signal is generated. At this time, an amount of data of the UL data is reduced by a process of, for example, puncturing, and the UL data that has been subjected to puncturing is assigned to the portion of the subsequent resource that does not overlap with the first resource. The UL signal that includes the UL data is transmitted to the base station device 200 through the wireless communication unit 120 (Step S207).

The UL data is assigned to the portion of the subsequent resource that does not overlap with the first resource, so that the UCI and the UL data do not simultaneously transmitted. As a result, the frequency band that is used for the transmission does not vary during the transmission of the UCI, and thus, it is possible to simplify the control of the transmission power. Furthermore, instead of assigning the UL data to a part of the subsequent resource, it may also be possible to cancel the transmission of the UL data that is supposed to be performed by using the subsequent resource.

If the result of the determination performed at Step S205 indicates that the first resource is not the resource for the UCI but is the resource for the UL data (No at Step S205), the UCI and the UL data are multiplexed together and multiplexed data is generated by the UL signal generating unit 115. Then, the multiplexed data is assigned to the resource for the UL data, and the UL signal is generated. The UL signal that includes the UCI and the UL data is transmitted to the base station device 200 through the wireless communication unit 120 (Step S208).

In this way, in the embodiment, even if the first resource is the resource for the UL data, this resource is determined to be the transmission opportunity of the UCI, and then, the UCI and the UL data are transmitted by using the first resource.

Incidentally, if the result of the LBT process performed at the timing of the first resource indicates that the U band is busy (No at Step S204), the UCI and the UL data are not transmitted by using the first resource. Then, if the timing of the subsequent resource that is subsequently started between the resources for the UCI and the UL data arrives, the LBT process is performed on the U band by the LBT processing unit 130 (Step S209). If the result of the LBT process indicates that the U band is also busy at the timing of the subsequent resource (No at Step S209), the first resource and the subsequent resource at this timing are not used for the transmission of the UCI and the UL data. In contrast, if the result of the LBT process indicates that the U band is idle (Yes at Step S209), the UCI is output from the transmission timing control unit 114 to the UL signal generating unit 115 in order to transmit the UCI by using the subsequent resource.

Then, whether or not the subsequent resource is the resource for the UCI is determined by the UL signal generating unit 115 (Step S210), and, if the subsequent resource is the resource for the UCI (Yes at Step S210), the UCI is assigned to the subsequent resource and the UL signal is generated. The UL signal that includes the UCI is transmitted to the base station device 200 through the wireless communication unit 120 (Step S211).

If the result of the determination performed at Step S210 indicates that the subsequent resource is not the resource for the UCI but is the resource for the UL data (No at Step S210), the UCI and the UL data are multiplexed together and the multiplexed data is generated by the UL signal generating unit 115. Then, the multiplexed data is assigned to the resource for the UL data, and the UL signal is generated. The UL signal that includes the UCI and the UL data is transmitted to the base station device 200 through the wireless communication unit 120 (Step S208).

In this way, in the embodiment, even if the subsequent resource is the resource for the UL data, this resource is determined to be the transmission opportunity of the UCI, and the UCI and the UL data are transmitted by using the subsequent resource. Therefore, both of the first resource and the subsequent resource serve as the transmission opportunity of the UCI, and, if the result of the LBT process indicates that the U band is idle, it is possible to transmit the UCI by using one of the resources. In other words, it is possible to increase the transmission opportunity of the UCI in the U band in which the LBT process is performed and it is thus possible to prevent degradation of the communication characteristics in the wireless communication performed by using the U band.

Figure 5:
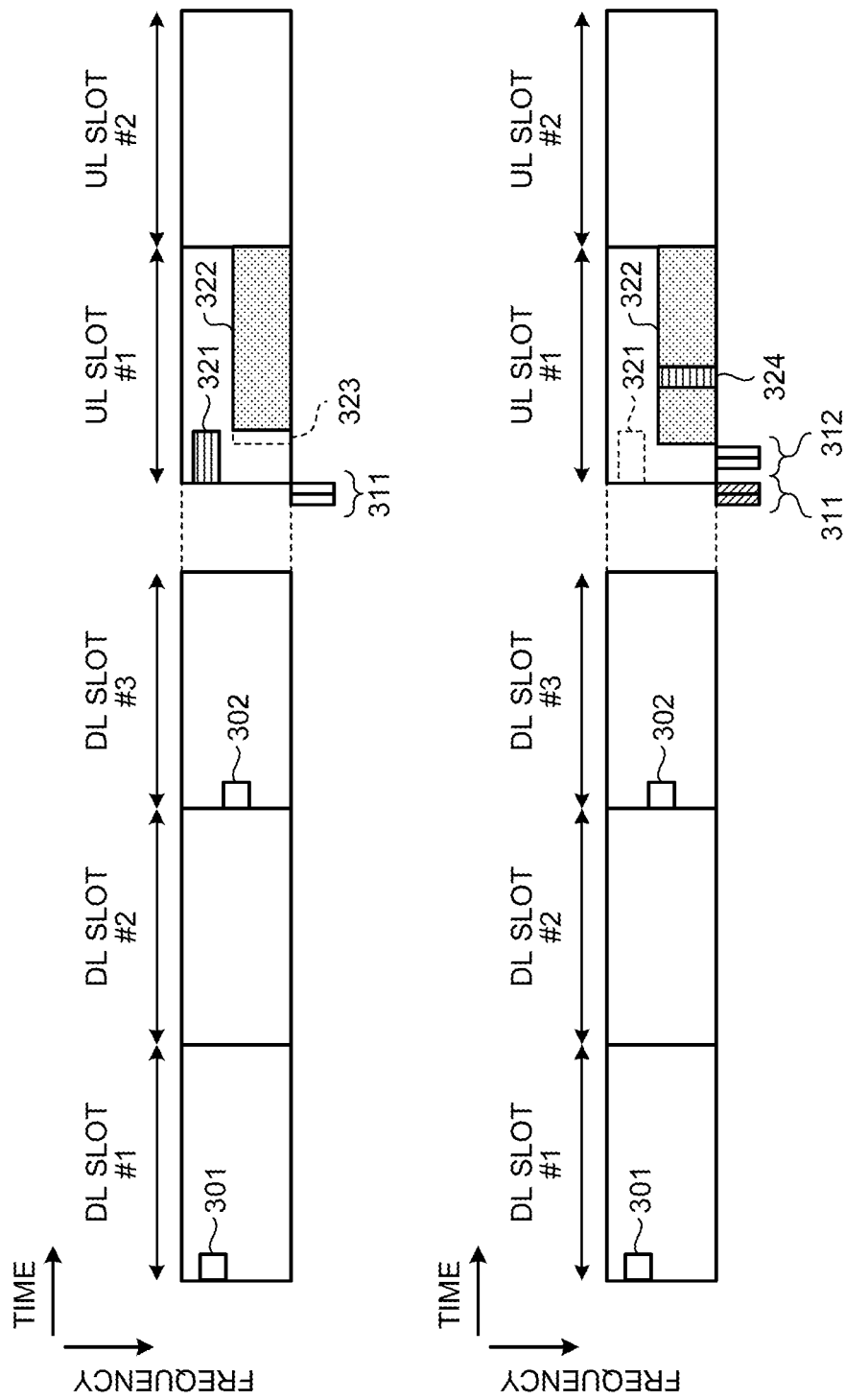
FIG. 5 is a specific example of a resource assignment in an unlicensed band.
Figure 6:
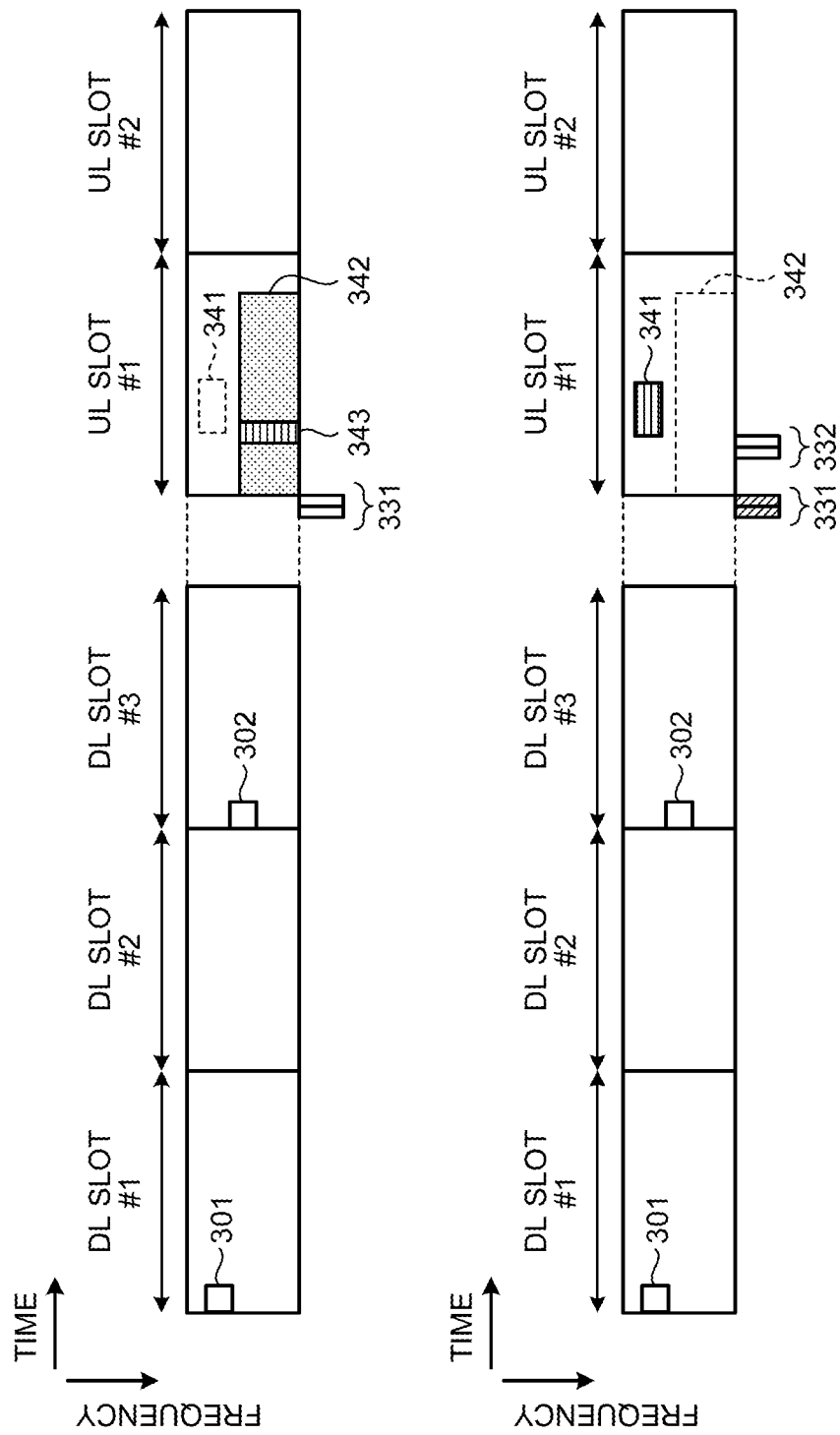
FIG. 6 is a diagram illustrating another specific example of the resource assignment in the unlicensed band.

In the following, a specific example of a transmission method of the UCI will be described with reference to FIGS. 5 and 6. In a description below, a case in which the Ack/Nack is transmitted as the UCI will be described. FIGS. 5 and 6 are diagrams each illustrating a specific example of the resource assignment of the U band. Namely, FIGS. 5 and 6 illustrates a specific example of the control information and data with respect to the downlink slots (DL slots #1 to #3) and the uplink slots (UL slots #1 and #2) that are associated with the U band.

FIG. 5 is a diagram illustrating a case in which the first resource is the resource for the UCI and the subsequent resource is the resource for the UL data. As illustrated in the upper part of FIG. 5, in the DL slot #1, a DL assignment 301 is transmitted, and the resource allocation of the DL data in the DL slot #1 is notified to the terminal device 100. The DL assignment 301 designates the resource that is used to transmit the Ack/Nack with respect to the DL data, and, here, it is assumed that the DL assignment 301 designates a resource 321 in the UL slot #1.

Furthermore, in the DL slot #3, a UL grant 302 is transmitted, and the resource that is used to transmit the UL data is notified to the terminal device 100. The UL grant 302 designates the resource allocated to the UL data for the terminal device 100 on the basis of the result of the scheduling of the uplink performed, by the base station device 200, on the SR transmitted from the terminal device 100. Here, it is assumed that the UL grant 302 designates the resource 322 in the UL slot #1.

In FIG. 5, the start time of the resource 321 for the Ack/Nack is before the start time of the resource 322 for the UL data, and the first resource 321 and the subsequent resource 322 temporally overlap in a portion 323. In other words, although the start time of the resource 321 for the Ack/Nack is different from the start time of the resource 322 for the UL data, both resources partially and temporally overlap with each other. In such a case, the transmission opportunity of the Ack/Nack is present twice at the time of the first resource 321 and the subsequent resource 322.

Namely, as illustrated in the upper part of FIG. 5, the LBT process is performed at a start timing 311 of the first resource 321, and, if the U band is idle, the Ack/Nack is transmitted by using the first resource 321. At this time, the UL data is transmitted by using the subsequent resource 322; however, the portion 323 that overlaps with the first resource 321 is not used for the transmission of the UL data. Namely, an amount of data of the UL data is reduced by a process of, for example, puncturing, and the UL data that has been subjected to puncturing is transmitted by using the subsequent resource 322 that does not temporally overlap with the first resource 321.

In contrast, if the U band is busy at the start timing 311 of the first resource 321, as illustrated in a lower part of FIG. 5, the first resource 321 is not used for the transmission of the Ack/Nack, and the LBT process is performed at a start timing 312 of the subsequent resource 322. Then, if the U band is idle at the start timing 312, the Ack/Nack and the UL data are multiplexed, and then, the obtained multiplexed data is transmitted by using the subsequent resource 322. At this time, an amount of data of the UL data is reduced by a process of, for example, puncturing, the Ack/Nack is transmitted by a resource 324 that has become vacant due to the reduction in the amount of data of the UL data.

In this way, if the first resource 321 is the resource for the Ack/Nack and the subsequent resource 322 is the resource for the UL data, the LBT process is performed at the start timing associated with each of the resources, and the Ack/Nack is transmitted by using the resource that is in an idle state. Consequently, the number of transmission opportunities of the UCI is increased in the U band in which the LBT process is performed, so that it is possible to prevent degradation of the communication characteristics in the wireless communication performed by using the U band.

FIG. 6 us a diagram illustrating a case in which the first resource is the resource for the UL data and the subsequent resource is the resource for the UCI. In FIG. 6, components that are the same as those illustrated in FIG. 5 are assigned the same reference numerals and descriptions thereof will be omitted. As illustrated in the upper part of FIG. 6, in the DL slot #1, the DL assignment 301 is transmitted, and the resource allocation of the DL data in the DL slot #1 is notified to the terminal device 100. The DL assignment 301 designates the resource that is used to transmit the Ack/Nack with respect to the DL data, and, here, it is assumed that the DL assignment 301 designates a resource 341 in the UL slot #1.

Furthermore, in the DL slot #3, the UL grant 302 is transmitted, and the resource that is used to transmit the UL data is notified to the terminal device 100. The UL grant 302 designates the resource allocated to the UL data for the terminal device 100 on the basis of the result of the scheduling of the uplink performed, by the base station device 200, on the SR transmitted from the terminal device 100. Here, it is assumed that the UL grant 302 designates the resource 342 in the UL slot #1.

In FIG. 6, the start time of the resource 341 for the Ack/Nack is after the start time of the resource 342 for the UL data, and the first resource 342 temporally overlaps with the subsequent resource 341. In other words, although the start time of the resource 341 for the Ack/Nack is different from the start time of the resource 342 for the UL data, both resources partially and temporally overlap with each other. In such a case, the transmission opportunity of the Ack/Nack is present twice at the time of the first resource 342 and the subsequent resource 341.

Namely, as illustrated in the upper part of FIG. 6, the LBT process is performed at a start timing 331 of the first resource 342, and, if the U band is idle, the Ack/Nack and the UL data are multiplexed, and then, the multiplexed data is transmitted by using the first resource 342. At this time, an amount of data of the UL data is reduced by a process of, for example, puncturing, and the Ack/Nack is transmitted by using a resource 343 that has become vacant due to the reduction in the amount of data of the UL data.

In contrast, if the U band is busy at the start timing 331 of the first resource 342, as illustrated in the lower part of FIG. 6, the first resource 342 is not used for the transmission of the Ack/Nack and the UL data, and the LBT process is performed at a start timing 332 of the subsequent resource 341. Then, if the U band is idle at the start timing 332, the Ack/Nack is transmitted by using the subsequent resource 341.

In this way, if the first resource 342 is the resource for the UL data and the subsequent resource 341 is the resource for the Ack/Nack, the LBT process is performed at the start timing of each of the resources, and the Ack/Nack is transmitted by using the resource that is in the idle state. Consequently, the number of transmission opportunities of the UCI is increased in the U band in which the LBT process is performed, so that it is possible to prevent degradation of the communication characteristics in the wireless communication performed by using the U band.

As described above, according to the embodiment, if the resource for the control information temporally overlaps with the resource for the data, both of the resources are determined to be the transmission opportunity of the control information, and the control information is transmitted by using the resource that is idle indicated by the result of the LBT process. Consequently, the number of transmission opportunities of the control information is increased as compared to a case where only the resource allocated to the control information is determined to be the transmission opportunity of the control information, so that it is possible to improve transmission possibility of the control information on the uplink in the U band. As a result, it is possible to prevent degradation of the communication characteristics in the wireless communication performed by using the U band.

Furthermore, in the first embodiment described above, a description has been mainly described a case in which the resource for the Ack/Nack temporally overlaps with the resource for the UL data; however, the embodiment is not limited to this. Namely, for example, also, in a case where the resources allocated to a plurality of pieces of different UCI, such as the Ack/Nack and the CSI, partly and temporally overlap with each other, the plurality of resources may be determined to be the transmission opportunities of the respective pieces of UCI. Therefore, in a case where, for example, the resources allocated to the Ack/Nack and the CSI temporally overlap with each other, if the first resource is idle, the Ack/Nack and the CSI are multiplexed and transmitted by using the first resource. Furthermore, even if the first resource is busy, if the subsequent resource is idle, the Ack/Nack and the CSI are multiplexed and transmitted by using the subsequent resource.

Furthermore, in the first embodiment described above, it is assumed that the UCI and the UL data are not simultaneously transmitted in a case where the UCI is transmitted by using the first resource and the UL data is transmitted by using the subsequent resource. However, if a variation in the frequency band that is used during the transmission is acceptable, the UL data may be transmitted by using a portion of the subsequent resource that temporally overlaps with the first resource. Namely, regarding the portion in which the first resource temporally overlaps with the subsequent resource, the UCI and the UL data may be simultaneously transmitted.

Furthermore, in the first embodiment described above, it is assumed that the terminal device 100 transmits the UL data by using the resource designated by the UL grant that is received from the base station device 200 after the transmission of the SR; however, the resource that is used to transmit the UL data may be a periodic resource that is set by signaling of, for example, radio resource control (RRC) signaling.

Furthermore, in the first embodiment described above, the description has been made on the assumption that the resource for the UCI and the resource for the UL data are determined to be the transmission opportunity of the UCI; however, a plurality of resources do not always need to be the transmission opportunity of the UCI. Namely, whether or not the plurality of resources are determined to be the transmission opportunity of the UCI may be set to be switchable. For example, regarding the Ack/Nack, whether or not to give an approval of a plurality of transmission opportunities to the Ack/Nack may be designated by the DL assignment. Furthermore, by allowing the UL grant to designate whether or not the UL data is the UL data that permits to be multiplexed with the UCI, whether or not to give an approval of the plurality of transmission opportunities to the UCI may be designated. In this way, it is possible to allow, for example, the DCI to flexibly switch whether or not to give an approval of the plurality of transmission opportunities to the UCI. Furthermore, it may also be possible to previously set by using, for example, RRC signaling, whether or not to give an approval of the plurality of transmission opportunities to the UCI.

[b] Second Embodiment

The characteristic of a second embodiment is that whether or not to give an approval of the plurality of transmission opportunities to the UCI is switched in accordance with priority of the UCI.

Figure 7:
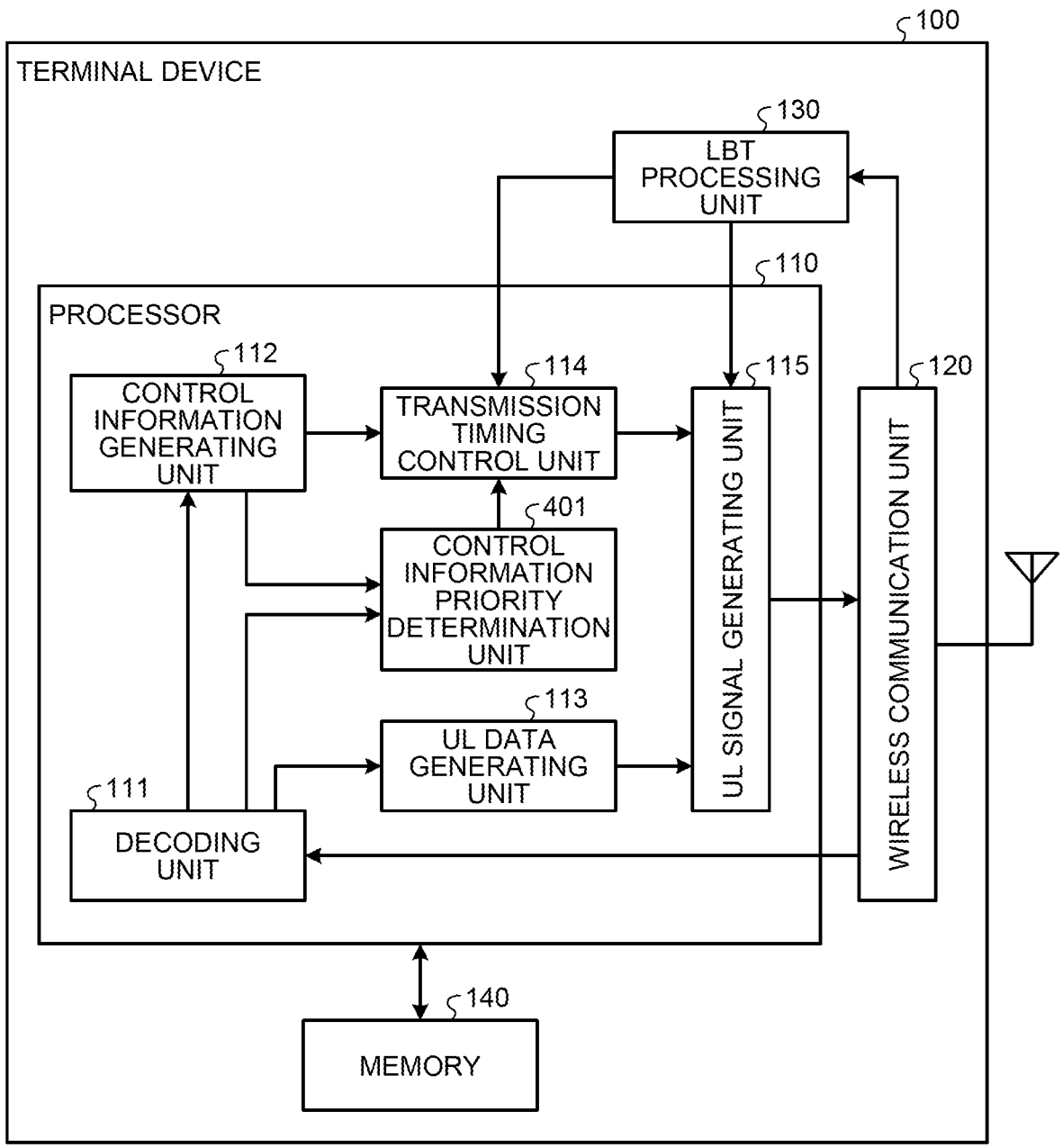
FIG. 7 is a block diagram illustrating a configuration of a terminal device according to a second embodiment.

FIG. 7 is a block diagram illustrating a configuration of the terminal device 100 according to the second embodiment. In FIG. 7, components that are the same as those illustrated in FIG. 1 are assigned the same reference numerals and descriptions thereof will be omitted. The terminal device 100 illustrated in FIG. 7 has a configuration in which a control information priority determination unit 401 is added to the terminal device 100 illustrated in FIG. 1.

The control information priority determination unit 401 determines the priority of the UCI on the basis of the UCI generated by the control information generating unit 112 or the DCI acquired by the decoding unit 111. Then, the control information priority determination unit 401 decides whether or not to give an approval of a plurality of transmission opportunities to the UCI in accordance with the priority of the UCI, and then, notifies the transmission timing control unit 114 of the decision result.

Specifically, the control information priority determination unit 401 distinguishes the priority of the pieces of UCI in accordance with the type of the UCI generated by the control information generating unit 112, and decides whether or not to give an approval of the plurality of transmission opportunities to the respective pieces of UCI. Namely, the control information priority determination unit 401 decides to approve a plurality of transmission opportunities of, for example, Ack/Nack, but decides, on the other hand, not to approve a plurality of transmission opportunities of, for example, a SR and CSI. Then, the control information priority determination unit 401 notifies the transmission timing control unit 114 of the decision result indicating that a plurality of transmission opportunities are approved for the Ack/Nack but a plurality of transmission opportunities are not approved for the SR and the CSI.

Furthermore, the control information priority determination unit 401 may also decide whether or not to give an approval of a plurality of transmission opportunities to the Ack/Nack with respect to the DL data in accordance with the format or the content of the DCI (mainly a DL assignment) acquired by the decoding unit 111. Namely, if, for example, a size, a radio network temporary identifier (RNTI), a search space (SS), a control resource set (CORESET), or the like of the DL assignment is associated with the priority of the Ack/Nack with respect to the DL data, the control information priority determination unit 401 distinguishes the priority of the Ack/Nack in accordance with the format of each of the DL assignments. Then, the control information priority determination unit 401 decides whether or not to give an approval of a plurality of transmission opportunities to the Ack/Nack in accordance with the priority of the Ack/Nack, and notifies the transmission timing control unit 114 of the decision result.

Furthermore, if information on the priority of the Ack/Nack with respect to the DL data is included in a specific field in the DL assignment, the control information priority determination unit 401 may also distinguish the priority of the Ack/Nack in accordance with the content of the DL assignment in addition to or instead of the format of the DL assignment described above.

In the embodiment, regarding the UCI to which an approval of the plurality of transmission opportunities is given, the transmission timing control unit 114 performs control such that the UCI is transmitted by using the resource that is at the timing at which the U band is idle between the resource for the UCI and the resource for the UL data. In contrast, regarding the UCI to which an approval of the plurality of transmission opportunities is not given, the transmission timing control unit 114 performs control such that the UCI and the UL data are multiplexed and are transmitted by using this resource only when the U band is idle at the timing of the resource for the UL data.

Figure 8:
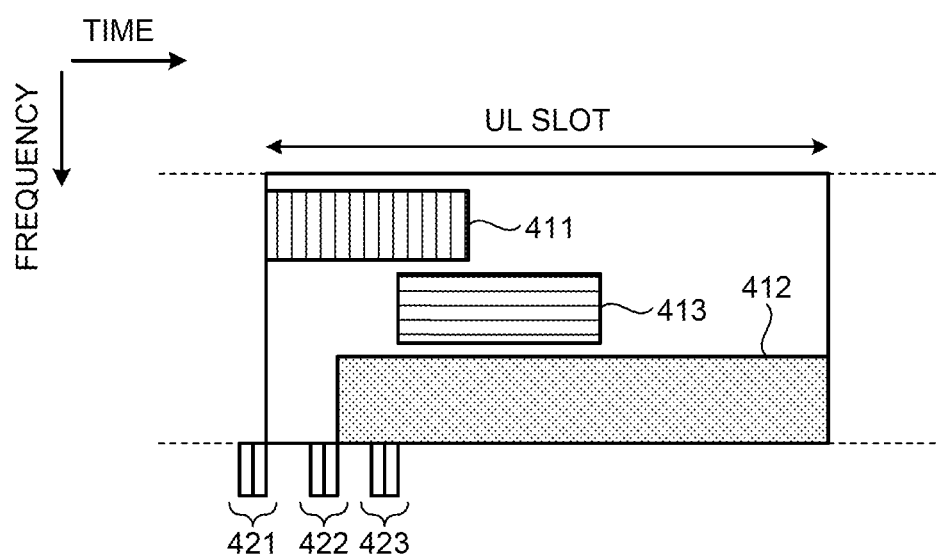
FIG. 8 is a diagram illustrating a transmission timing of control information.

In the following, a transmission timing of the UCI according to the second embodiment will be described with reference to FIG. 8. FIG. 8 is a diagram illustrating the transmission timing of the UCI. As illustrated in FIG. 8, it is assumed that, in an uplink slot (UL slot), a resource 411 is allocated to the CSI, a resource 413 is allocated to the Ack/Nack, and a resource 412 is allocated to the UL data. In the UL slot, the resource 411 is started first, then, the resource 412 is started, and lastly, the resource 413 is started. Then, at least a part of the resources 411 to 413 temporally overlaps with each other.

In the resource assignment performed in this way, a case in which a plurality of transmission opportunities are approved for the Ack/Nack but a plurality of transmission opportunities are not approved for the CSI is considered. In this case, if a start timing 421 of the resource 411 for the earliest CSI arrives, the LBT process is performed by the LBT processing unit 130. Then, if the U band is idle at the start timing 421 of the resource 411, the CSI is multiplexed with the Ack/Nack, and the obtained multiplexed data is transmitted by using the resource 411.

If the U band is busy at the start timing 421 of the resource 411, the LBT process is performed at a start timing 422 of the resource 412 for the subsequent UL data. Then, if the U band is idle at the start timing 422 of the resource 412, the UL data is multiplexed with the Ack/Nack, and the obtained multiplexed data is transmitted by using the resource 412. At this time, not only the UL data and the Ack/Nack, but also the multiplexed data in which the CSI is multiplexed may be transmitted.

If the U band is busy at the start timing 422 of the resource 412, the LBT process is performed at a start timing 423 of the resource 413 for the last Ack/Nack. Then, if the U band is idle at the start timing 423 of the resource 413, the Ack/Nack is transmitted by using the resource 413. At this time, transmission of the CSI and the UL data by using resource 413 is not performed.

In this way, the Ack/Nack to which an approval of a plurality of transmission opportunities is given has three resources 411 to 413 as the transmission opportunities and is transmitted by using the resource that is at the timing at which the U band is idle. Consequently, it is possible to enhance a transmission possibility of the Ack/Nack that has high priority and to which an approval of a plurality of transmission opportunities is given, and it is thus possible to prevent degradation of the communication characteristics.

As described above, according to the embodiment, whether or not to give an approval of a plurality of transmission opportunities to the UCI in accordance with the priority of the UCI, and regarding the UCI to which an approval of the plurality of transmission opportunities is given, the resource for the UL data or the resource for another UCI are also set to be transmission opportunities. Consequently, it is possible to efficiently transmit the control information having high priority, and it is thus possible to prevent degradation of the communication characteristics.

Furthermore, in the second embodiment described above, the description has been made on the assumption that whether or not to give an approval of a plurality of transmission opportunities to the Ack/hack is decided in accordance with the format or the content of the DCI (DL assignment); however, the embodiment is not limited to this. For example, the priority of the Ack/Nack associated with a large number of pieces of DL data may be increased and the priority of the Ack/Nack associated with a small number of pieces of DL data may be decreased. Namely, for example, an approval of a plurality of transmission opportunities is given to the Ack/Nack associated with four or more pieces of DL data, whereas an approval of a plurality of transmission opportunities is not given to the Ack/Nack associated with less than four pieces of DL data. The number of pieces of DL data associated with the Ack/Nack may be determined on the basis of, for example, the number of bits constituting the Ack/Nack. Namely, it may be determined to be the Ack/Nack that is associated with a larger number of pieces of DL data as the number of bits constituting the Ack/Nack is increased.

Furthermore, the priority of the Ack/Nack may be decided on the basis of a proportion of, for example, the Ack relative to the Ack/Nack associated with the plurality of pieces of DL data. For example, an approval of a plurality of transmission opportunities is given to the Ack/Nack that includes the number of Acks greater than or equal to a predetermined (for example, more than half the number of Acks), whereas an approval of a plurality of transmission opportunities is not given to the Ack/Nack that includes the number of Acks less than the predetermined number. The predetermined number in this case may be designated by the base station device 200 or may be set to the terminal device 100 in advance.

[c] Third Embodiment

The characteristic of a third embodiment is that whether or not to give an approval of a plurality of transmission opportunities to the UCI is switched in accordance with priority of the UL data.

Figure 9:
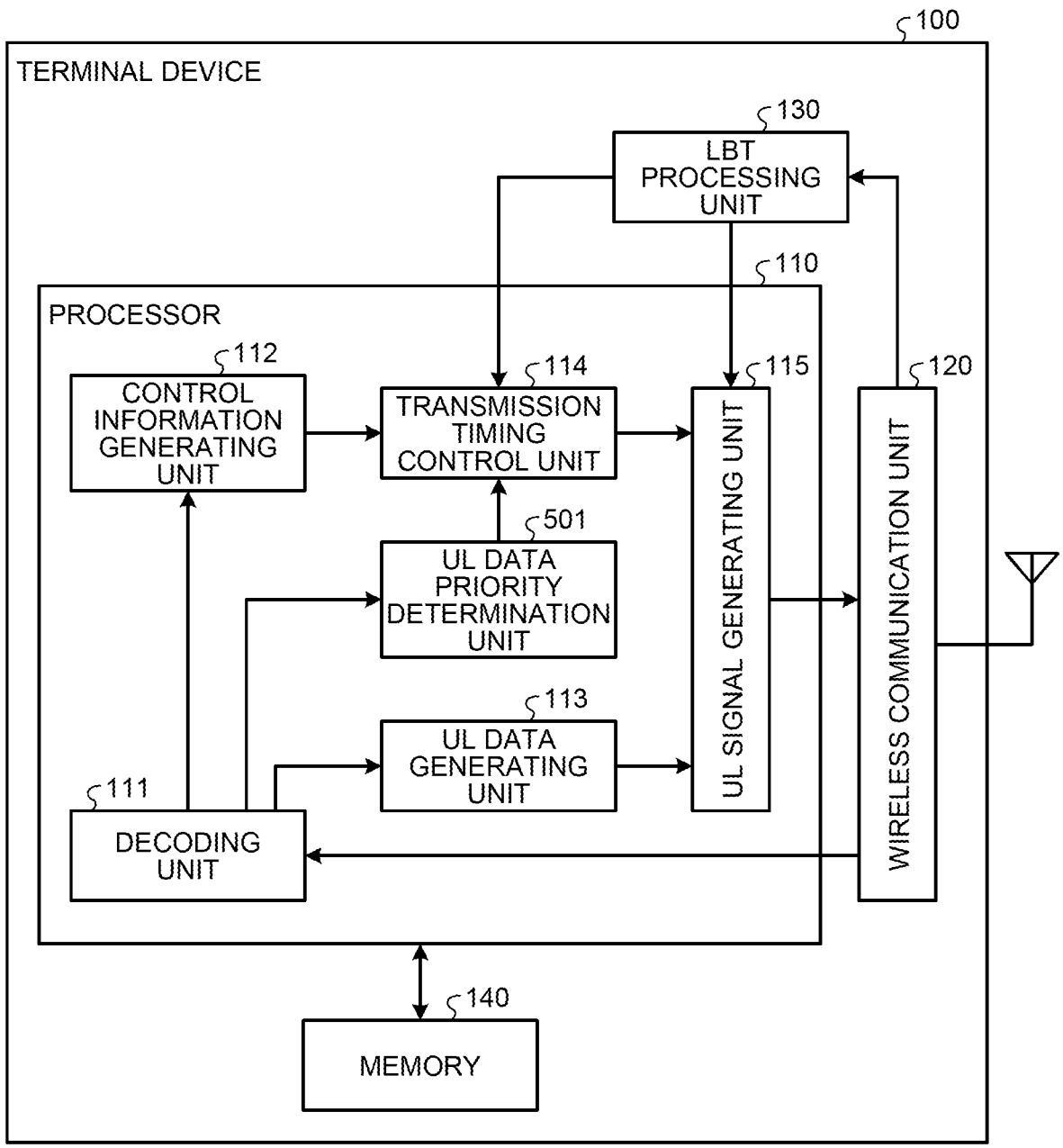
FIG. 9 is a block diagram illustrating a configuration of a terminal device according to a third embodiment.

FIG. 9 is a block diagram illustrating a configuration of the terminal device 100 according to the third embodiment. In FIG. 9, components that are the same as those illustrated in FIG. 1 are assigned the same reference numerals and descriptions thereof will be omitted. The terminal device 100 illustrated in FIG. 9 has a configuration in which a UL data priority determination unit 501 is added to the terminal device 100 illustrated in FIG. 1.

The UL data priority determination unit 501 determines the priority if the UL data on the basis of the DCI acquired by the decoding unit 111. Then, the UL data priority determination unit 501 decides whether or not to give an approval of a plurality of transmission opportunities to the UCI in accordance with the priority of the UL data, and then, notifies the transmission timing control unit 114 of the decision result.

Specifically, the UL data priority determination unit 501 decides whether or not to use the resource for the UL data as the transmission opportunity of the UCI in accordance with the DCI (mainly a UL grant) acquired by the decoding unit 111. Namely, the UL data priority determination unit 501 acquires a UL grant including a channel access priority Class (CAPC) that designates the priority of the UL data, and distinguishes the priority of the UL data in accordance with the CAPC. Then, the UL data priority determination unit 501 determines whether or not to transmit the UCI by giving priority to the UCI over the UL data in accordance with the priority of the UL data, and decides whether or not to give an approval of a plurality of transmission opportunities to the UCI. Namely, if the priority of the UL data is relatively high, the UL data priority determination unit 501 determines that priority is given to the UL data over the UCI, and decides not to give an approval of a plurality of transmission opportunities the UCI. Furthermore, if the priority of the UL data is relatively low, the UL data priority determination unit 501 determines that priority is given to the UCI over the UL data, and decides to give an approval of a plurality of transmission opportunities to the UCI. The UL data priority determination unit 501 notifies the transmission timing control unit 114 whether or not to give an approval of a plurality of transmission opportunities to the UCI.

FIG. 10 is a diagram illustrating a specific example of an association relationship between the CAPC and identification information on a quality class (i.e., a quality class identifier (QCI)) related to the UL data.

As illustrated in FIG. 10, the CAPC classifies the priority of the UL data into, for example, four levels 1 to 4, and the QCI of the UL data is associated with each of the pieces of priority. Namely, for example, the UL data with the QCI of 1, 3, 5, 65, 66, 69, or 70 is the UL data that has the highest priority and in which the CAPC is 1. Furthermore, for example, the UL data with the QCI of 2 or 7 is the UL data that has the second highest priority and in which the CAPC is 2.

If this type of CAPC is included in the UL grant, the UL data priority determination unit 501 acquires the CAPC included in the UL grant, and grasps the priority of the UL data generated by the UL data generating unit 113. Then, if, for example, the CAPC of the UL data is 1 or 2, the priority of the UL data is relatively high, so that the UL data priority determination unit 501 gives the priority to the UL data over the UCI, and decides not to give an approval of a plurality of transmission opportunities to the UCI. Furthermore, if, for example, the CAPC of the UL data is 3 or 4, the priority of the UL data is relatively low, so that the UL data priority determination unit 501 gives the priority to the UCI over the UL data, and decides to give an approval of a plurality of transmission opportunities to the UCI.

Furthermore, the UL data priority determination unit 501 further finely distinguishes the CAPC and decides, if, for example, the CAPC of the UL data is 1, to transmit only the UL data by cancelling the transmission of the UCI. In contrast, if, for example, the CAPC of the UL data is 2, the UL data priority determination unit 501 decides to perform transmission by using the resource for the UL data after the UCI is multiplexed with the UL data. In other words, if the CAPC of the UL data is 1, the UL data priority determination unit 501 sets the number of transmission opportunities of the UCI to zero and, if the CAPC of the UL data is 2, the UL data priority determination unit 501 sets the number of transmission opportunities of the UCI to once.

Furthermore, if, for example, the CAPC of the UL data is 3, the UL data priority determination unit 501 decides that the two resources are the transmission opportunities of the UCI only when the resource for the UL data is the first resource and the resource for the UCI is the subsequent resource. Then, if, for example, the CAPC of the UL data is 4, the UL data priority determination unit 501 decides that the resource for the UL data, the resource for the UCI, and the two resources are the transmission opportunities of the UCI. In other words, if the CAPC of the UL data is 3, the UL data priority determination unit 501 sets the number of transmission opportunities of the UCI to be twice with conditions attached and, if the CAPC of the UL data is 4, the UL data priority determination unit 501 sets the number of transmission opportunities of the UCI to be twice.

In the description above, the UCI is not transmitted by using the resource for the UCI in a case where the priority of the UL data is high, and the reason for this is as follows. Namely, in a case where the resource for the UCI temporally overlaps with the resource for the UL data, if the UCI is transmitted by using the resource for the UCI, the resource for the UCI that temporally overlaps with the resource for the UL data is not used for the transmission of the UL data.

In other words, for example, an amount of data of the UL data is reduced or the transmission of the UL data is cancelled by a process of puncturing, so that at least a part of the UL data having high priority is lacked. In order to prevent this situation, if the priority of the UL data is high, the resource for the UCI is not permitted to be the transmission opportunity of the UCI, and the multiplexed data obtained by multiplexing the UCI with the UL data is transmitted by using the resource for the UL data.

Furthermore, in a case where the CAPC of the UL data is 3 described above, the two resource are decided to be the transmission opportunities of the UCI only when the resource for the UL data is the first resource and the resource for the UCI is the subsequent resource. This is because, in a case where the resource for the UL data is the first resource and the resource for the UCI is the subsequent resource, if the U band is busy at the start timing of the first resource, the UL data is not originally transmitted and is not affected accordingly even if the UCI is transmitted by using the subsequent resource.

In the embodiment, if an approval of a plurality of transmission opportunities is given to the UCI, the transmission timing control unit 114 performs control such that the UCI is transmitted by using the resource in which U band is idle as a timing between the resource for the UCI and the resource for the UL data. In contrast, if an approval of a plurality of transmission opportunities is not given to the UCI, the transmission timing control unit 114 performs control such that transmission is performed by multiplexing the UCI with the UL data by using this resource only when the U band is idle at that timing of the resource for the UL data.

As described above, according to the embodiment, whether or not to give an approval of a plurality of transmission opportunities to the UCI is determined in accordance with priority of the UL data, and, if an approval of a plurality of transmission opportunities is given to the UCI, the resource for the UCI and the resource for the UL data are set to be the transmission opportunities for the UCI. Furthermore, if an approval of a plurality of transmission opportunities is not given to the UCI, the resource for the UL data is set to be the transmission opportunity for the UCI. Consequently, if the priority of the UL data is high, the resource for the UCI is not used for the transmission of the UCI, and thus, the transmission of the UL data in the resource that temporally overlaps with the resource for the UCI is not canceled. As a result, it is possible to prevent degradation of the communication characteristics.

Furthermore, in the third embodiment described above, it is assumed that whether or not to give an approval of a plurality of transmission opportunities to the UCI is decided in accordance with the CAPC included in the UL grant; however, the embodiment is not limited to this. For example, if a size, a RNTI, a search space, a CORESET, or the like of UL grant is associated with the priority of the UL data, whether or not to give an approval of a plurality of transmission opportunities to the UCI may be decided in accordance with these format of the UL grant.

The second and the third embodiments described above may be used in combination. Namely, whether or not to give an approval of a plurality of transmission opportunities to the UCI may be determined in accordance with both of the priority of the UCI and the priority of the UL data. Namely, if, for example, the priority of the UCI is high and the priority of the UL data is low, an approval of a plurality of transmission opportunities may be given to the UCI, and, if the priority of the UCI is high and the priority of the UL data is also high, an approval of a plurality of transmission opportunities may be given to the UCI with conditions. The situation with conditions mentioned here may be set such that, for example, the resource for the UL data is the first resource and the resource for the UCI is subsequent resource.

Furthermore, if, for example, the priority of the UCI is low and the priority of the UL data is also low, the multiplexed data obtained by multiplexing the UCI with the UL data may be transmitted by using the resource for the UL data and, if the priority of the UCI is low and the priority of the UL data is high, the transmission of the UCI may be canceled. In other words, if the priority of the UCI is low and the priority of the UL data is also low, the number of transmission opportunities of the UCI may be set to once and, if the priority of the UCI is low and the priority of the UL data is high, the number of transmission opportunities of the UCI may be set to zero.

According to an aspect of an embodiment of the terminal device, the base station device, and the wireless communication system, an advantage is provided in that it is possible to prevent degradation of the communication characteristics in wireless communication performed by using an unlicensed band.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
   a transmitter that transmits a transmission signal; and
   processor circuitry configured to:
      determine whether or not an unlicensed band for which a license is not needed to use in wireless communication is being used by another device;
      generate first information and second information to which a first resource and a second resource in the unlicensed band, respectively, are allocated;
      determine whether the unlicensed band for which a license is not needed to use in wireless communication; and
      in a case where at least a part of the first resource temporally overlaps with a part of the second resource,
         generate, when a first determination result that is obtained by the determining whether the unlicensed band for which a license is not needed to use in wireless communication and that is related to a resource that is started temporally first among the first resource and the second resource indicates that the unlicensed band is not being used, the transmission signal by assigning the first information to the resource that is started temporally first, and
         generate, when the first determination result indicates that the unlicensed band is being used, the transmission signal by assigning the first information to a resource that is subsequently started among the first resource and the second resource, in accordance with a second determination result that is obtained by the determining whether the unlicensed band for which a license is not needed to use in wireless communication and that is related to the resource that is subsequently started.

2. The terminal device according to claim 1, wherein
   the processor circuitry is further configured to determine priority of the first information, and
   the generating of the transmission signal includes
      in a case where the priority of the first information is lower than a predetermined criterion, generating, when a third determination result that is related to the second resource and that is obtained by the determining whether the unlicensed band for which a license is not needed to use in wireless communication, the transmission signal by assigning the first information and the second information to the second resource, and
      in a case where the priority of the first information is higher than the predetermined criterion, generating, when the first determination result indicates that the unlicensed band is not being used, the transmission signal by assigning the first information to the resource that is started temporally first, and generating, when the first determination result indicates that the unlicensed band is being used, the transmission signal by assigning the first information to the resource that is subsequently started in accordance with the second determination result.

3. The terminal device according to claim 2, wherein the determining includes determining the priority of the first information based on a type of the first information.

4. The terminal device according to claim 2, wherein the determining includes determining the priority of the first information based on a format or content of control information that is received by the terminal device and that designates the first resource.

5. The terminal device according to claim 1, wherein
   the processor circuitry is further configured to determine priority of the second information, and
   the generating of the transmission signal includes
      in a case where the priority of the second information is higher than a predetermined criterion, generating, when a third determination result that is related to the second resource and that is obtained by the determining whether the unlicensed band for which a license is not needed to use in wireless communication, the transmission signal by assigning the first information and the second information to the second resource, and
      in a case where the priority of the second information is lower than the predetermined criterion, generating, when the first determination result indicates that the unlicensed band is not being used, the transmission signal by assigning the first information to the resource that is started temporally first, and generating, when the first determination result indicates that the unlicensed band is being used, the transmission signal by assigning the first information to the resource that is subsequently started in accordance with the second determination result.

6. The terminal device according to claim 5, wherein the determining includes determining the priority of the second information based on a format or content of control information that is received by the terminal device and that designates the second resource.

7. The terminal device according to claim 1, wherein the generating of the transmission signal includes
in a case where the resource that is started temporally first is the second resource, multiplexing the first information with the second information and assigning the multiplexed information to the one-resource that is started temporally first, and
in a case where the resource that is subsequently started is the second resource, multiplexing the first information with the second information and assigning the multiplexed information to the resource that is subsequently started.

8. The terminal device according to claim 1, wherein the generating of the transmission signal includes
in a case where at least a part of the first resource temporally overlaps with a part of the second resource, generating the transmission signal by switching between assigning the first information to the second resource and assigning the first information to the resource that is started temporally first or the resource that is subsequently started.

9. A base station device that receives a signal from a terminal device that transmits first information and second information by using a first resource and a second resource, respectively, in an unlicensed band for which a license is not needed to use in wireless communication, the base station device comprising:
processor circuitry that generates control information that designates at least one of the first resource and the second resource;
a transmitter that transmits the control information generated by the processor circuitry; and
a receiver that, in a case where at least a part of the first resource temporally overlaps with a part of the second resource,
receives, when the unlicensed band is able to be used in a resource that is started temporally first among the first resource and the second resource, the first information transmitted by using the resource that is started temporally first, and
receives, when the unlicensed band is not able to be used in the resource that is started temporally first but is able to be used in a resource that is subsequently started among the first resource and the second resource, the first information transmitted by using the resource that is subsequently started.

10. A wireless communication system comprising a terminal device and a base station device, wherein
the terminal device includes
a transmitter that transmits a transmission signal; and
processor circuitry configured to:
determine whether or not an unlicensed band for which a license is not needed to use in wireless communication is being used by another device;
generate first information and second information to which a first resource and a second resource in the unlicensed band, respectively, are allocated; and
in a case where at least a part of the first resource temporally overlaps with a part of the second resource,
generate, when a first determination result that is obtained by the determining whether the unlicensed band for which a license is not needed to use in wireless communication and that is related to a resource that is started temporally first among the first resource and the second resource indicates that the unlicensed band is not being used, the transmission signal by assigning the first information to the resource that is started temporally first, and
generate, when the first determination result indicates that the unlicensed band is being used, the transmission signal by assigning the first information to a resource that is subsequently started among the first resource and the second resource, in accordance with a second determination result that is obtained by the determining whether the unlicensed band for which a license is not needed to use in wireless communication and that is related to the resource that is subsequently started, and
the base station device includes
a receiver that receives the transmission signal transmitted from the transmitter.

* * * * *